United States Patent
Coyle et al.

(10) Patent No.: US 7,821,675 B2
(45) Date of Patent: Oct. 26, 2010

(54) METHODS AND INK COMPOSITIONS FOR INVISIBLY PRINTED SECURITY IMAGES HAVING MULTIPLE AUTHENTICATION FEATURES

(75) Inventors: William J. Coyle, Lebanon, OH (US); John C. Smith, Fletcher, NC (US)

(73) Assignee: Angstrom Technologies, Inc., Florence, KY (US)

( * ) Notice: Subject to any disclaimer, the term of this patent is extended or adjusted under 35 U.S.C. 154(b) by 1835 days.

(21) Appl. No.: 10/818,058

(22) Filed: Apr. 5, 2004

(65) Prior Publication Data

US 2004/0233465 A1  Nov. 25, 2004

Related U.S. Application Data

(60) Provisional application No. 60/460,599, filed on Apr. 4, 2003.

(51) Int. Cl.
 C09D 11/00 (2006.01)
 H04N 1/50 (2006.01)
(52) U.S. Cl. .................. 358/3.28; 358/1.9; 358/502; 358/518; 347/95; 347/43; 106/31.01; 106/31.58; 106/31.86; 106/31.15; 380/51
(58) Field of Classification Search .......... 428/12; 473/471, 472, 479; 358/1.9, 3.28, 502, 518; 347/95, 43; 106/31.01, 31.58, 31.86, 31.15; 380/51
See application file for complete search history.

(56) References Cited

U.S. PATENT DOCUMENTS

| | | | |
|---|---|---|---|
| 4,865,937 A | | 9/1989 | Santilli et al. |
| 5,145,518 A | * | 9/1992 | Winnik et al. ............... 523/161 |
| 5,204,208 A | * | 4/1993 | Paine et al. ............. 430/137.12 |
| 5,225,900 A | | 7/1993 | Wright ......................... 358/75 |
| 5,256,193 A | | 10/1993 | Winnik et al. ................. 106/21 |
| 5,286,286 A | | 2/1994 | Winnik et al. ................. 106/21 |

(Continued)

FOREIGN PATENT DOCUMENTS

WO   WO0106453   1/2001

OTHER PUBLICATIONS

Wang YA, Li JJ, Chen H, and Peng X: Stabilization of Inorganic Nanocrystals by Organic Dendrons. J. Am. Chem. Soc., vol. 124, No. 10, 2293-2298, 2002.

(Continued)

Primary Examiner—David K Moore
Assistant Examiner—Quang N Vo
(74) Attorney, Agent, or Firm—Downs Rachlin Martin PLLC

(57) ABSTRACT

An article is marked with image indicia for authentication, information, or decoration by providing a plurality of inks having a plurality of fluorescence colors when exposed to excitation energy, separating colors of the image indicia into a plurality of image levels in accordance with the fluorescence colors of the inks, and printing each image level in mutual registration on the article using the corresponding ink. The image printed with each ink may be substantially invisible under illumination within the visible spectrum. The invisibly printed images have multiple authentication features, including the use of covert UV-fluorescent materials, IR-fluorophores, microparticles, and other chemical taggants. Ink compositions, methods for making the inks, and methods and apparatus for using the inks are also disclosed.

64 Claims, 11 Drawing Sheets

U.S. PATENT DOCUMENTS

| | | | |
|---|---|---|---|
| 5,414,258 A | 5/1995 | Liang | |
| 5,418,855 A | 5/1995 | Liang et al. | |
| 5,542,971 A | 8/1996 | Auslander et al. | 106/21 |
| 5,554,842 A | 9/1996 | Connell et al. | |
| 5,574,790 A | 11/1996 | Liang et al. | |
| 5,605,738 A | 2/1997 | McGinness et al. | |
| 5,684,069 A | 11/1997 | Auslander | 524/88 |
| 5,714,291 A | 2/1998 | Marinello et al. | |
| 5,719,948 A | 2/1998 | Liang | |
| 5,755,860 A | 5/1998 | Zhu | 106/31.15 |
| 5,763,891 A | 6/1998 | Yoshinaga et al. | |
| 5,837,042 A | 11/1998 | Lent et al. | 106/31.14 |
| 5,862,218 A * | 1/1999 | Steinberg | 713/176 |
| 5,880,062 A * | 3/1999 | Sanders et al. | 503/201 |
| 5,990,197 A | 11/1999 | Escano et al. | 523/160 |
| 6,104,812 A * | 8/2000 | Koltai et al. | 380/51 |
| 6,106,110 A | 8/2000 | Gundjuan et al. | 347/86 |
| 6,140,267 A | 10/2000 | Gundjian | |
| 6,149,719 A | 11/2000 | Houle | 106/31.14 |
| 6,192,635 B1 * | 2/2001 | Zheng | 135/126 |
| 6,303,929 B1 | 10/2001 | Oshima et al. | 250/271 |
| 6,373,965 B1 | 4/2002 | Liang | 382/112 |
| 6,378,976 B1 | 4/2002 | Byers et al. | |
| 6,400,386 B1 | 6/2002 | No | 347/176 |
| 6,461,257 B2 * | 10/2002 | Zheng | 473/471 |
| 6,603,871 B2 | 8/2003 | Liang | |
| 6,621,916 B1 * | 9/2003 | Smith et al. | 382/112 |
| 6,633,370 B2 | 10/2003 | Lawandy | 356/71 |
| 6,666,991 B1 | 12/2003 | Atarashi et al. | |
| 6,718,046 B2 * | 4/2004 | Reed et al. | 382/100 |
| 6,736,740 B2 * | 5/2004 | Zheng | 473/471 |
| 7,079,230 B1 | 7/2006 | McInerney et al. | |
| 2002/0066543 A1 | 6/2002 | Lilly | 162/140 |
| 2002/0178951 A1 * | 12/2002 | Lutz et al. | 101/483 |
| 2003/0006170 A1 * | 1/2003 | Lawandy | 209/3.3 |
| 2003/0025925 A1 * | 2/2003 | Elsman et al. | 358/1.9 |
| 2003/0072015 A1 * | 4/2003 | Fujino | 358/1.9 |
| 2003/0112423 A1 | 6/2003 | Vig et al. | |
| 2004/0023397 A1 | 2/2004 | Vig et al. | |
| 2004/0071366 A1 * | 4/2004 | Zhang et al. | 382/284 |
| 2004/0151371 A1 * | 8/2004 | Chen et al. | 382/165 |
| 2004/0169847 A1 | 9/2004 | Dukler | |
| 2005/0019603 A1 | 1/2005 | Kathirgamanathan | |
| 2005/0243305 A1 | 11/2005 | Vig et al. | |

OTHER PUBLICATIONS

Gerion D, Pinaud F, William SC, Parak WJ, Zanchet D, Weiss S, and Alivisatos AP: Synthesis and Properties of Biocompatible Water-Soluble Silica-Coated CdSe/ZnS Semiconductor Quantom Dogs. J. Phys. Chem. B 2001, 105, 8861-8871.

Alivisatos AP: Semiconductor Clusters, Nanocrystals, and Quantum Dots. Science, vol. 271, 933-937, Feb. 16, 1996.

Hines MA and Guyot-Sionnest P: Synthesis and Characterization of Strongly Luminescing ZnS-Capped CdSe Nanocrystals. J. Phys. Chem. 1996, 100, 468-471.

Mićić OI, Sprague JR, Curtis CJ, Jones KM, Machol JL, Nozik AJ, Giessen H, Fluegel B, Mohs G and Peyghambarian: Synthesis and Characterization of InP, GaP, and GaInP$_2$ Quantum Dots. J. Phys. Chem. 1995, 99, 7754-7759.

Murray CB, Norris DJ, and Bawendi MG: Synthesis and Characterization of Nearly Monodisperse CdE (E=S, Se, Te) Semiconductor Nanocrystallites. J. Am Chem. Soc. 1993, 115, 8706-0715.

Reynolds GA and Drexage KH: Stable Heptamethine Pyrylium Dyes That Absorb in the Infrared. J. Org. Chem., vol. 42, No. 5, 885-888, 1977.

World Wide Web URL, http://www.efg2.com/lab/graphics/colors/chromaticity.htm.

Synthesis of Luminescent Organic/Inorganic Polymer Nanocomposites. Steven C. Farmer and Timothy E. Patten, Polymeric Materials Science and Engineering, V. 82 (2000), pp. 237-238.

* cited by examiner

METHODS AND INK COMPOSITIONS FOR INVISIBLY PRINTED SECURITY IMAGES HAVING MULTIPLE AUTHENTICATION FEATURES

RELATED APPLICATION DATA

This application claims the benefit of priority of U.S. Provisional Patent Application Ser. No. 60/460,599, filed Apr. 4, 2003, and titled "Methods and Ink Compositions for Invisibly Printed Security Images Having Multiple Authentication Features," which application is incorporated by reference herein in its entirety.

FIELD OF THE INVENTION

The present invention generally relates to the field of security printing and more particularly to ink-jet printing of color fluorescent indicia and authentication of articles such as documents for security purposes. In particular, the present invention is directed to methods and ink compositions for invisibly printed security images having multiple authentication features.

BACKGROUND OF THE INVENTION

There is a need for improved methods and materials which extend the current knowledge and applications to create practical, cost-effective solutions for the security field. Security of currency, identification documents, product brands, and other materials has become an increasingly important concern for government and industry. As theft and fraud increase, security protocols must evolve to detect and prevent the increasingly more sophisticated and technologically based methods of counterfeiting and product diversion.

While there are many different methods and techniques used to provide security, an approach that uses more than one type of security is preferable. In such an approach, multiple security discrimination features are examined.

If one or more of the individual features is compromised, the security of the system as a whole remains intact. Such methods using multiple discrimination features are taught, for example, in U.S. Pat. No. 5,418,855 to Liang et al., assigned to the same assignee as the present invention.

The use of fluorescent materials such as ultraviolet (UV)-fluorescent, infrared (IR)-fluorescent, or near-infrared (NIR)-fluorescent materials for security markings is well known. The use of fluorescent materials allows the user to easily detect the security markings by irradiation of the marks with a suitable UV or NIR/IR light source. The fact that fluorescent materials emitting light in the visible spectrum can be detected by simple examination has made them easier to counterfeit and/or duplicate. However, this fact is also an advantage in that the user can easily and quickly authenticate the security marks.

While there are important distinctions between the uses of UV-fluorescent and IR-fluorescent materials that emit in the IR (infrared) and/or NIR (near-infrared) range, there are also advantages and disadvantages in the use and applicability of the latter materials, e.g., the NIR/IR emissions are not detectable by simple visual observation. As with UV fluorescence, this can be advantageous for some applications, but disadvantageous for other applications.

Many fluorescent materials are also easily detectable under illumination in the visible portion of the spectrum, but "invisible" fluorescent materials are known, i.e., those materials that are not visually detectable under ordinary white-light, but emit detectable fluorescent light when illuminated by light outside the visible spectrum.

Inkjet printing is a versatile technique in that it can deliver small volumes of liquid inks with a variety of different compositions that can be specifically formulated for many different applications. Inkjet printing methods have been used successfully to print on a variety of different substrates, including many types of paper, from cardboard to newsprint, many types of fabric, and various other polymers, such as plastic. These characteristics make inkjet printing an excellent method of delivery for many types of materials, including fluorescent indicia for security marking. Color inkjet printers, however, typically use sets of subtractive-color inks (typically 3-6 inks in a set), combined in accordance with a corresponding color space. Such inks are generally not fluorescent and are intended to be visible under ordinary white-light illumination (illumination in the visible portion of the spectrum, having wavelengths generally in the range between 400 nm and 700 nm).

While fluorescent security indicia have been widely used in currency and in passports and other identification documents, most of such applications have used single fluorescent colors or simple combinations of individual colors, which have often been visible under ordinary white-light illumination. Thus, security applications using such fluorescent materials may not provide the level of security desired for certain applications.

The foregoing shortcomings and problems of the prior art are improved upon, and further advantageous solutions are provided by the present invention.

SUMMARY OF THE INVENTION

According to one aspect of the present invention, invisibly printed images are provided, which display full-color high-resolution images upon exposure to suitable excitation energy. Such images are useful, not only in authentication, but also in decoration and presentation of information.

In accordance with another aspect of the described embodiments, methods of inkjet printing security markings are provided, including stand-alone methods and combinations of methods to create an article that has multiple authentication features, e.g., multiple layers of security protection. In this respect, the present invention serves to provide multiple methods of security and specific materials that may be used alone or in combination.

In accordance with another aspect of the described embodiments, ink compositions are provided that can produce high-resolution images that are invisible to the naked eye under ordinary white-light illumination, but can be seen with specific color values of emission when exposed to suitable excitation energy and/or with the aid of specific optical filters.

In accordance with another aspect of the described embodiments, methods are provided to mask or hide the emission of a set of fluorophores with additional fluorescent color(s) and to subsequently read the hidden image with the aid of specific optical filters and suitable excitation energy.

In accordance with another aspect of the described embodiments, methods are provided of authentication and security marking that can be detected and/or interpreted by the use of a specific device or machine.

In accordance with another aspect of the described embodiments, methods are provided for reproducing certain color ranges for use in high-resolution inkjet printing of security markings and other fluorescent images.

Another aspect of described embodiments of the invention provides various ink compositions corresponding to fluorescent emission colors of purple, blue, green, yellow, orange, red, brown, and white, for example, suitable for use with commercially available inkjet printers.

Ink compositions are also provided that allow printing to be done using paper containing an optical brightener, without interference from the brightener. Methods are also provided for reproducing dark colors (such as black, for example) for use with types of paper that do not contain optical brighteners or with types that prevent emission to one side of paper from a brightener on the other side. A method using inks containing fluorescent quencher(s) used to create a "black" color on optical brightener-containing paper, other optically brightened substrates, or any substrate containing undesired fluorescence, is also described.

According to another aspect of the invention, full-color, high-resolution images that are visible only when viewed using suitable excitation energy are created using inkjet printing techniques. The excitation energy may be long-wave UV, and/or short-wave UV, and/or IR for various inks. The image is thus adapted to be authenticated, either visually or through the use of a machine (scanner) tuned specifically for the excitation and emission characteristics of the ink components used to create the image.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DESCRIPTION OF THE INVENTION

Embodiments of the invention described in detail are intended to be illustrative, and the invention is not limited to the materials, conditions, compositions, or other parameters shown in these embodiments.

Throughout this specification and the appended claims, the term "invisible" means substantially undetectable to the unaided human eye under illumination by light in the visible portion of the optical spectrum (generally considered as having wavelengths in the range between about 400 nm and about 700 nm), also referred to as "white light."

Figure 1:
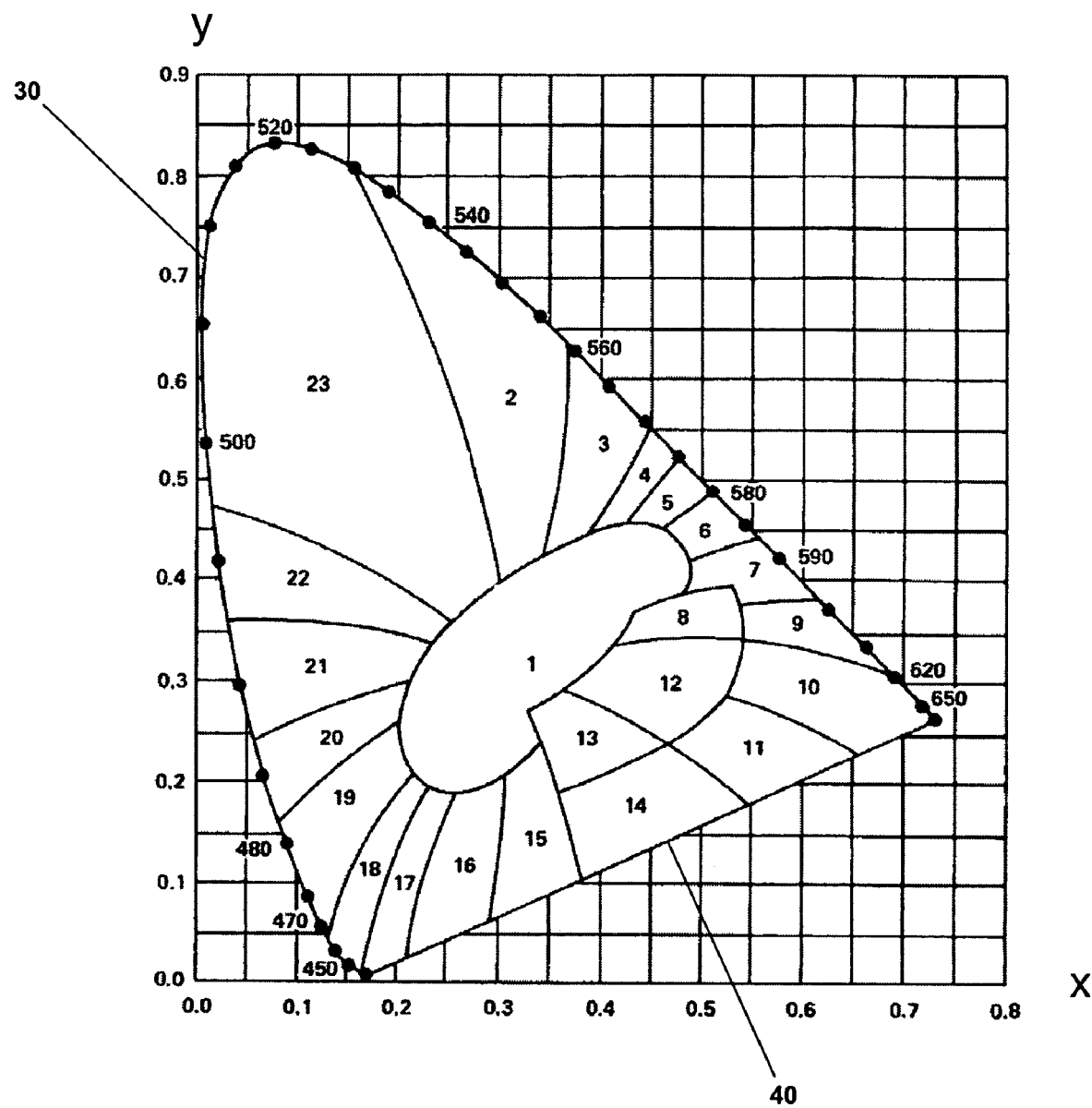
FIG. 1 is a conventional CIE 1931 chromaticity diagram showing approximate regions generally identified with some common color names.

As background for the following description of the invention, FIG. 1 shows a conventional CIE 1931 chromaticity diagram illustrating approximate regions generally identified with some common names of hues as listed in TABLE 1. TABLE 1 shows the hue designations and the reference numeral corresponding to each hue. FIG. 1 is based on the article by Kenneth L. Kelly, "Color Designations for Lights," Journal of the Optical Society of America, vol. 33 (1943) pp. 627-632.

TABLE 1

Reference Numerals Corresponding to Hues in FIG. 1

| Reference numeral | Hue |
| --- | --- |
| 1 | Illuminant Area |
| 2 | Yellowish Green |
| 3 | Yellow-Green |
| 4 | Greenish Yellow |
| 5 | Yellow |
| 6 | Yellowish Orange |
| 7 | Orange |
| 8 | Orange Pink |
| 9 | Reddish Orange |
| 10 | Red |
| 11 | Purplish Red |
| 12 | Pink |
| 13 | Purplish Pink |
| 14 | Red Purple |
| 15 | Reddish Purple |
| 16 | Purple |
| 17 | Bluish Purple |
| 18 | Purplish Blue |
| 19 | Blue |
| 20 | Greenish Blue |
| 21 | Blue-Green |
| 22 | Bluish Green |
| 23 | Green |

Those skilled in the art will understand that the boundaries delineating named hue regions in the chromaticity diagram in FIG. 1 are somewhat arbitrary, and for the purpose of describing the present invention serve only to indicate qualitatively and approximately where various hues are located in the continuous visual color space represented by the chromaticity diagram, without reproducing the chromaticity diagram in color. Full-color reproductions of the CIE 1931 chromaticity diagram are readily available in many published references on color theory and colorimetry, including the World Wide Web URL, http://www.efg2.com/Lab/Graphics/Colors/Chromaticity.htm.

The "horseshoe" shaped line 30 is the spectral locus. Wavelengths in nanometers (nm) are shown around the edge. The straight line 40 connecting the endpoints of the "horseshoe" curve is known as the non-spectral "line of purples." Coordinates x and y measured along the abscissa and ordinate axes respectively are related to tristimulus values X, Y, and Z by the relationships $x=X/(X+Y+Z)$; $y=Y/(X+Y+Z)$; $z=Z/(X+Y+Z)$; and $x+y+z=1$.

Figure 2:
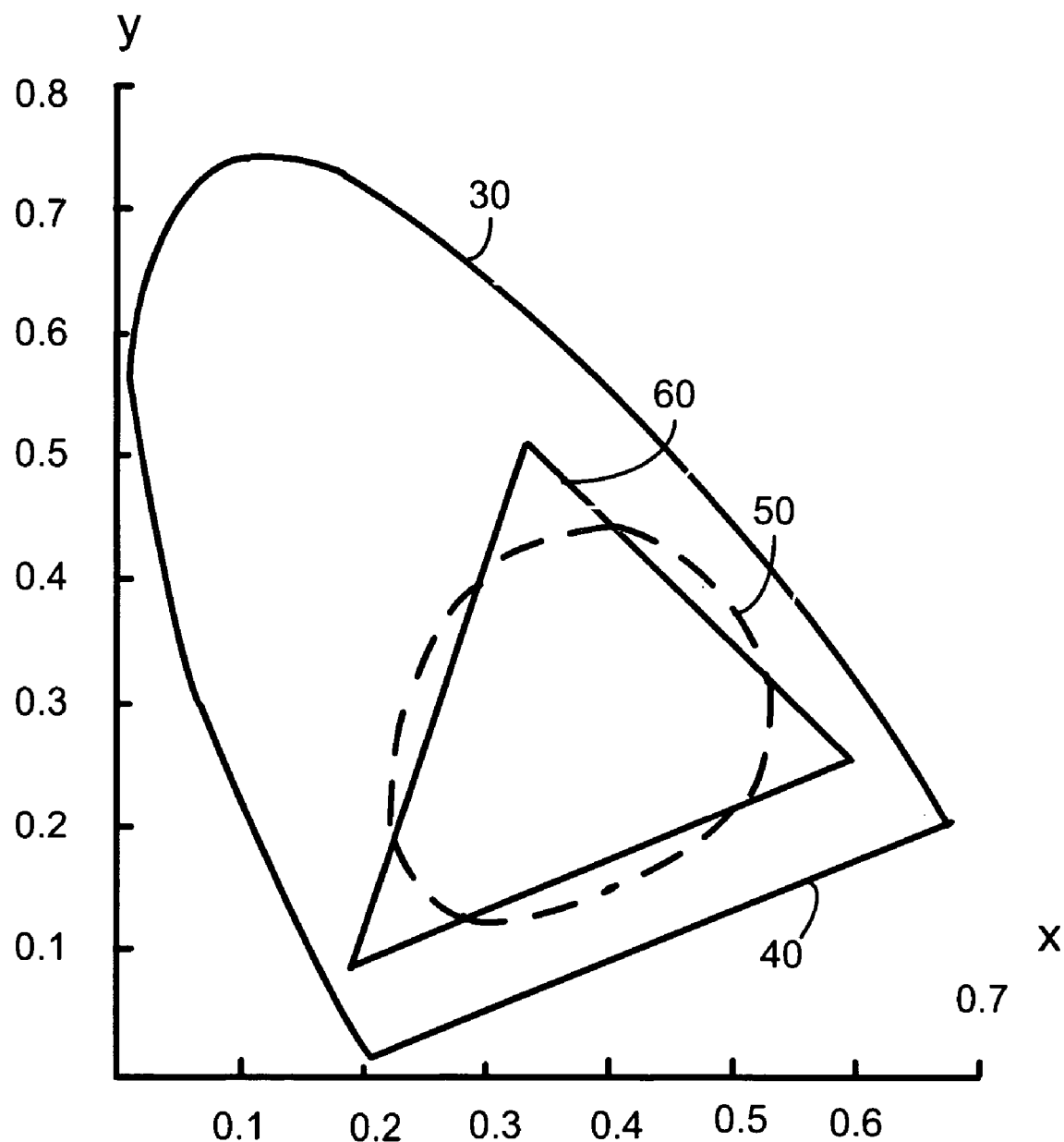
FIG. 2 is a CIE 1931 chromaticity diagram illustrating gamuts of conventional subtractive-color and additive-color systems.

FIG. 2 is a CIE 1931 chromaticity diagram schematically illustrating approximate gamuts of conventional subtractive-color and additive-color systems, i.e., the limited portions of the whole chromaticity diagram that can be reproduced in those systems. Region 50 represents the approximate gamut of subtractive-color inks commonly used in color printing. The triangular region 60 represents the approximate gamut of the RGB system of additive colors commonly used for emissive displays. It will be apparent that the regions 50 and 60 do not coincide, so that colors of an image that may be represented on an RGB computer monitor, for example, may not match colors of the same original color image printed on a color printer, and there are colors that are achievable in one gamut that are not achievable at all in the other gamut. Nevertheless, there are many applications for which the color-rendering capabilities of both systems are entirely satisfactory.

A problem that occurs when one tries to print a color image with fluorescent inks may be readily understood by reference to FIG. 2. The normal subtractive-color inks commonly used in color printing are called subtractive colors because their perceived colors are determined by the light that they absorb or subtract from the incident light. The "subtractive primary colors" commonly used in color printing are cyan, yellow, magenta (and sometimes black). In printing colors of hues other than cyan, yellow, magenta, these subtractive primary colors combine by combining their absorptions. Thus, for example to print a green color, cyan and yellow inks are combined. Together, the cyan and yellow inks absorb light of wavelengths corresponding to red and blue, leaving only green light to be reflected from the printed ink.

However, the colors exhibited by fluorescent inks are emissive colors, which combine in an additive manner, not a subtractive manner to produce a resultant emission. Furthermore, no combination of non-fluorescent subtractive-color inks would create a fluorescent color, nor specifically an invisible image that is fluorescent. This problem would not be solved by merely substituting fluorescent inks with cyan, yellow, and magenta fluorescent emission even if such inks were all readily available. Therefore, the conventional method used to print color images with a color printer (for example, an inkjet printer) cannot be used.

The present invention includes methods for printing invisible images with specially formulated inks whose fluorescent emissions can be combined to form full-color, high resolution, images. "Full color" image, as used in this context, is defined as an image that contains colors that cannot be created by a single chromophore, but instead are created with combinations of chromophores. The meaning of "high resolution" varies, to some extent, as a function of the application in which the image is to be used. In general, resolutions greater than 400 dpi will suffice for the full-color, high resolution images of the present invention.

The images produced can be used for displaying information, for decoration, for marking an article with indicia for authentication, or for other purposes. Thus, a method for marking an article with image indicia includes providing a plurality of inks that produce fluorescence colors when exposed to suitable excitation energy (often illumination outside the visible spectrum), separating colors of the image indicia into a plurality of image levels in accordance with the fluorescence colors of the inks, and printing each image level in mutual registration on the article using the corresponding ink. Indicia printed with each of the inks are substantially invisible under illumination within the visible spectrum. As suggested above, the inks may comprise inkjet inks and the printing may be performed using an inkjet print head. Additional information concerning inkjet printers and printing is described in U.S. Pat. No. 6,149,719, which is incorporated herein by reference in its entirety.

Generally, no modification is needed of an inkjet printer intended for use with subtractive-color ink container (e.g., reservoir or cartridge), and such a printer can be used to print the invisible full-color fluorescent images. The printing is accomplished by converting images (or any indicia) to be printed to a color negative form and by replacing each subtractive-color ink container with a container containing one of the plurality of inks having a plurality of fluorescence colors. Specifically, each subtractive-color ink container is replaced by a container containing an ink of its complementary color. The cyan ink container is replaced with a container containing ink having a red fluorescence color. The magenta ink container is replaced with a container containing ink having a green fluorescence color. The yellow ink container is replaced with a container containing ink having a blue fluorescence color. In the case of inkjet printers that use reservoirs instead of cartridges or other containers, the reservoir is merely cleaned, using the process described below, and then is refilled with the complementary fluorescent ink. All three of the fluorescent inks may be inks that are invisible under ordinary illumination within the visible spectrum.

It will be recognized that the order of steps in the method described above may be varied. For example, the color separating may be done at any time, including a time just before providing the fluorescent inks by installing or filling their ink containers. Or the printer may be prepared by providing the fluorescent ink containers before the color separation is done.

Color separation and conversion of image data to a negative form may be performed with commercially available computer software, such as Adobe® Photoshop® or Adobe® PhotoShop® Elements (both available from Adobe Systems, Inc. of San Jose, Calif.), Corel® Photo-Paint™ (available from Corel Corp. of Ottawa, Ontario, Canada), or ArcSoft® PhotoStudio® (available from ArcSoft, inc. of Fremont, AC), or equivalent photo-editing software.

Those skilled in the art will recognize that visibility or invisibility of a printed ink may depend to some extent on the substrate on which it is printed. For example, a fluorescent ink containing a substantial amount of white pigment may often be printed on white paper and yet be invisible under ordinary illumination within the visible spectrum. The same ink would not be invisible under white light if printed on a black paper.

Many color inkjet printers use a CYMK system including cyan, yellow, magenta, and black inks. For such printers, the black-ink print head may be disabled, e.g., by replacing a black ink cartridge with a blank cartridge. Alternatively, for some applications, a black ink may be provided along with the inks that produce a plurality of fluorescence colors under illumination outside the visible spectrum (emissive or additive colors). The colors of the image indicia are separated into a black image level and the fluorescence-color image levels, and the printing is done as described above, including the un-reversed black image level. That is, all of the subtractive colors except black are converted to their color negatives, and all the ink colors except black are replaced by their color-complementary emissive inks (red for cyan, green for magenta, and blue for yellow, respectively). The base of the black ink and the printing of the black image level are user-optional.

Also, before using an inkjet printer with fluorescent ink containers substituted in the manner described above, it is advisable to clean the printer to remove any residue of non-fluorescent inks remaining from previous use of the inkjet printer before inserting the fluorescent ink containers. Similarly, as referenced above, when the inkjet printer uses refillable reservoirs to contain the ink, then it is generally desirable to clean the reservoirs to remove residual non-fluorescent inks. A suitable cleaning composition for this purpose consists of a mixture (by weight % (w/w)) of 2-propanol [67-63-

0]: 71.00%; N-methyl-2-pyrrolidinone [872-50-4]: 4.00%; butyl carbitol [112-34-5]: 5.00%; and diethylene glycol [111-46-6]: 20.00%.

The set of fluorescent inks includes a set of emissive colors that are the additive primary colors, red, green, and blue. A suitably weighted combination of these three colors combines to create white emission. For some applications, it may be useful to use combinations of only two of the three additive primary colors, such as red and green, red and blue, or blue and green. For example, invisible red-green fluorescent anaglyphs that combine to make a stereographic image when viewed through an appropriate filter over each eye may be printed using red and green sub-images. For another example, many colors may be obtained by printing red and green fluorescent inks on a blue fluorescent substrate.

However, to create full-color fluorescent images on a non-fluorescent substrate, the full set of three emissive colors is used, including the red, blue, and green additive primary colors. Since black "color" corresponds to no emission in an emissive or additive color system, black content in a full-color image may be handled for many applications by omitting the black separation image of a four-color additive-color separation. For other applications, such a black separation image may be printed without conversion to a negative image layer as described above.

To create a "black" color on a substrate that contains optical brighteners, an ink containing one or more fluorescent quenchers can be used to quench the white-blue fluorescent optical brightening effect created by the optical brighteners. This is accomplished by using an ink, possibly in place of the black cartridge of the inkjet printer, that contains one or more fluorescent quenchers, such as acrylamide, various amines, halogens, bromobenzene, various chlorides and chlorinated compounds, cobalt (Co 2+) ions, copper (Cu 2+) ions, dimethylformamide, disulfides, ethers, hydrogen peroxide, imidazole, histidine, iodide, nickel (Ni 2+) ions, nitro compounds, nitromethane, nitroxides, nitric oxide, various olefins, oxygen, other peroxides, pyridine, various quinones, silver (Ag+) ions, thallium (Ti+) ions, thiocyanate, and/or other known quenchers of fluorescence. These materials may be used separately or in combination to elicit the desired quenching effect. Then, a suitable clear-coat, binder, or other material that prevents the quenching of fluorescent inks can be subsequently printed over the quenched "black" areas to allow printing of additional fluorescent colors.

For certain applications, it may be desirable to create an image using the fluorescent inks of the present invention on a substrate that does not include optical brighteners. By eliminating the blue coloration provided by the optical brighteners in the substrate a non-emissive background "black" color is created, making it easier to create desired colors using various combinations of fluorescent inks. Photographic papers of the matte heavyweight photopaper type (part # S041257) available from Epson having optical brighteners on only one surface can be satisfactorily used as a substrate for receiving an image of the present invention, in this case the side that does not contain optical brighteners would be used as the "black" or non-emissive background. In selected cases, it may be desirable to use the fluorescent quenchers discussed above together with a substrate that lacks optical brighteners.

The fluorescent inks of the present invention may be used to create "inverse" barcodes. Inverse barcodes consist of bands of ink spaced from one another by portions of the substrate that lack ink. Thus, in inverse barcodes, the ink provides the "white" portion of the barcode pattern and the "black" portions are the sections between where the ink is printed. The "white" portions of the barcode may be printed with the white ink of the present invention, or may be printed with a color ink. The "black" portion of the barcode may be unprinted portions of a dark substrate or a substrate without optical brighteners or may be the portion of a substrate that has been coated with fluorescent quenchers of the type described above.

In terms of the wavelengths of the fluorescent emissions stimulated by UV excitation energy, the red component of the emissive colors may have a dominant emissive wavelength between about 590 and about 680 nanometers. The green component of the emissive colors may have a dominant emissive wavelength between about 500 and about 550 nanometers. The blue component of the emissive colors may have a dominant emissive wavelength between about 420 and about 480 nanometers.

Figure 3:
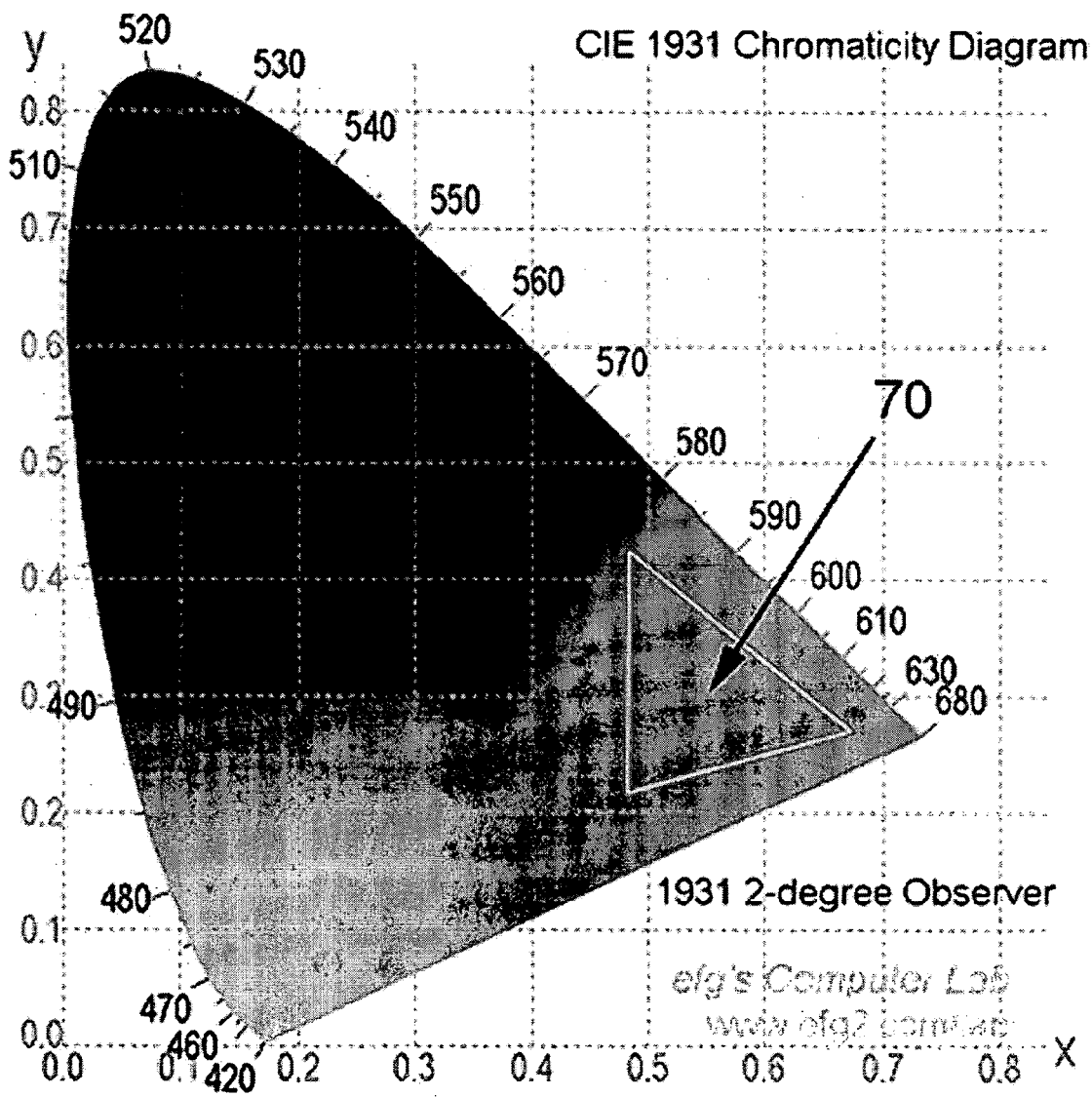
FIG. 3 is a black and white CIE 1931 chromaticity diagram illustrating a color region of red emissions of fluorescent ink embodiments made in accordance with the invention.
Figure 4:
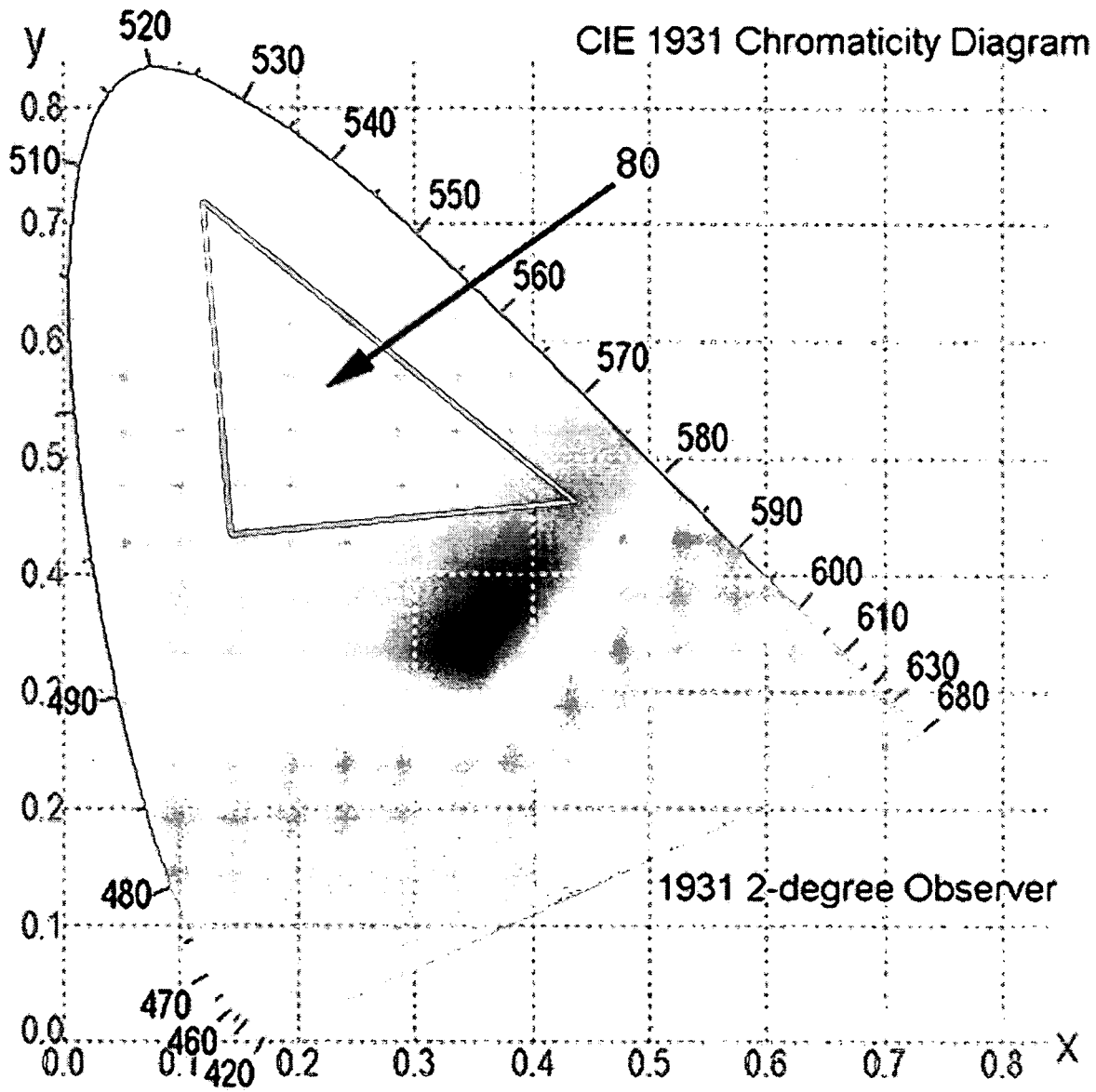
FIG. 4 is a black and white CIE 1931 chromaticity diagram illustrating a color region of green emissions of fluorescent ink embodiments made in accordance with the invention.
Figure 5:
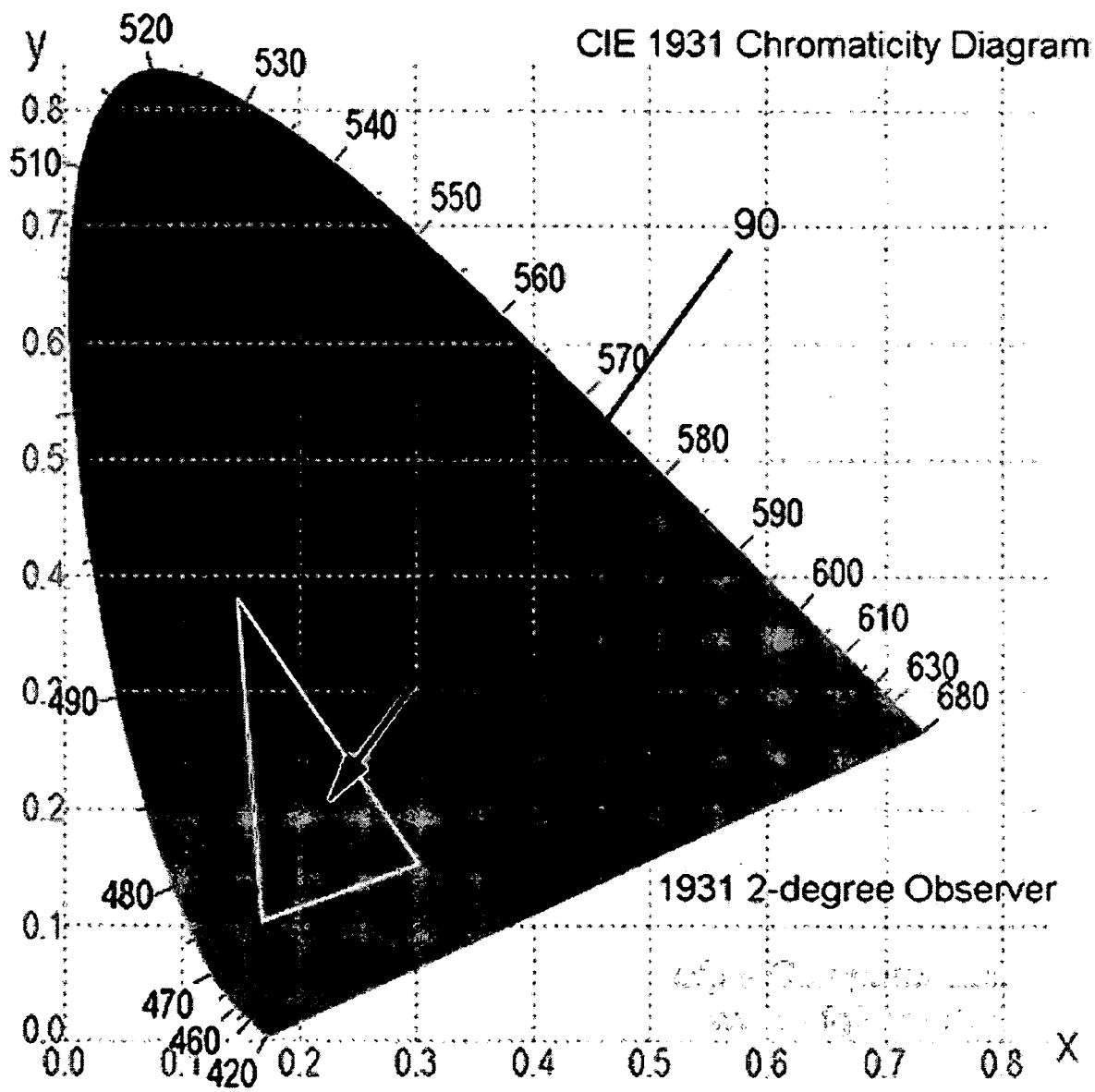
FIG. 5 is a black and white CIE 1931 chromaticity diagram illustrating a color region of blue emissions of fluorescent ink embodiments made in accordance with the invention.
Figure 6:
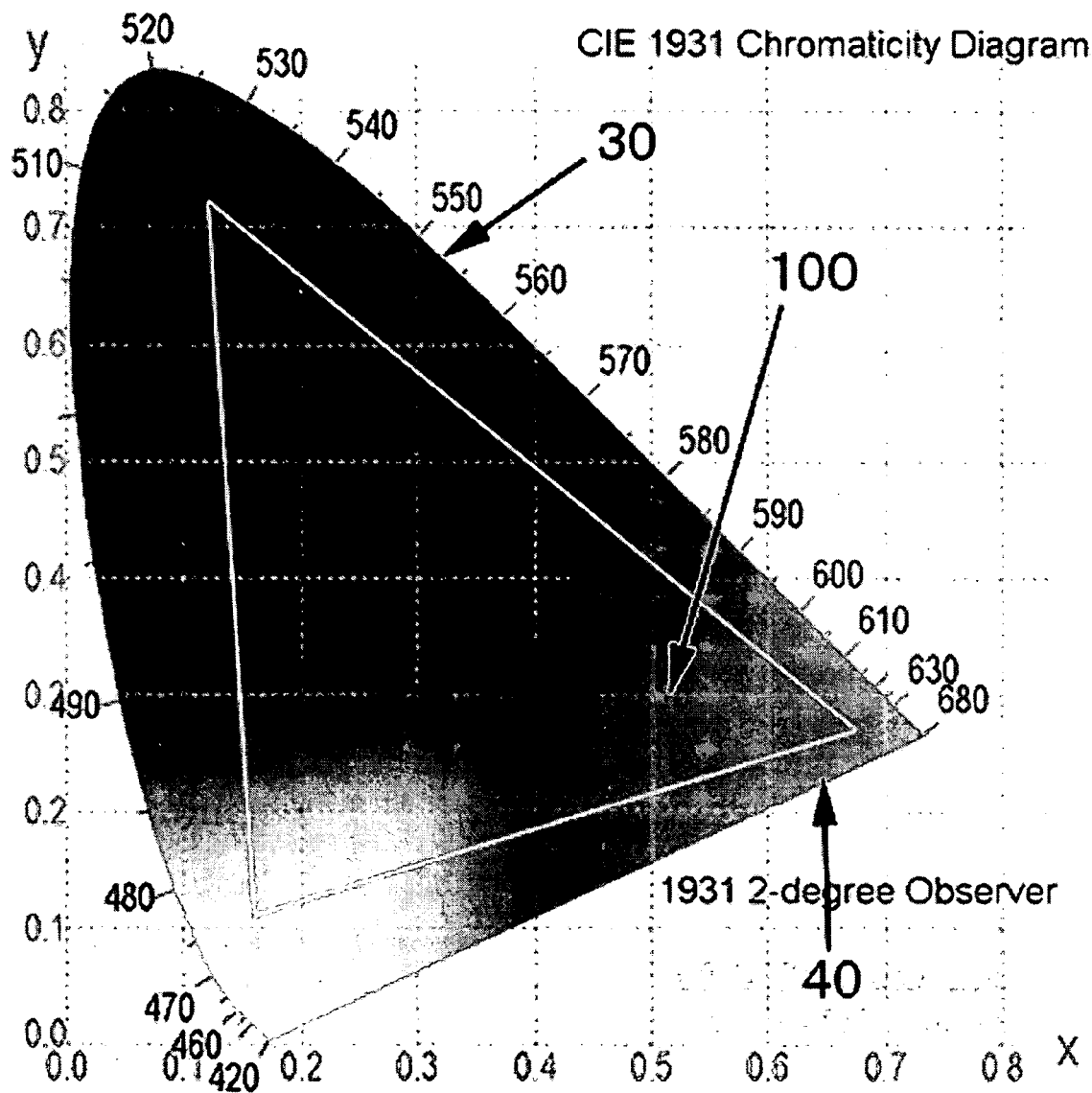
FIG. 6 is a black and white CIE 1931 chromaticity diagram illustrating a color gamut of emissions of fluorescent ink embodiments made in accordance with the invention.

FIGS. 3-5 are CIE 1931 chromaticity diagrams illustrating the three color regions of fluorescent emissions of the UV fluorescent ink embodiments made in accordance with the invention. FIG. 3 shows the color region 70 of red emissions of fluorescent ink. FIG. 4 shows the color region 80 of green emissions of fluorescent ink. FIG. 5 shows the color region 90 of blue emissions of fluorescent ink. FIG. 6 illustrates the resulting color gamut 100 of emissions of fluorescent ink embodiments made in accordance with the invention.

Another way of characterizing the emissive colors is by numerical coordinates in a CIE chromaticity diagram. For example a useful set of emissive colors includes a red component having CIE 1931 chromaticity coordinates describing a plane comprising the following (X,Y coordinate) points of approximately, (+/−0.05): (0.48, 0.22) (0.48, 0.43), and (0.67, 0.26); a green component having CIE 1931 chromaticity coordinates of (0.14, 0.42) (0.12, 0.72), and (0.43, 0.46); and a blue component having CIE 1931 chromaticity coordinates (0.16, 0.10) (0.15, 0.38), and (0.30, 0.15).

The particular red, blue, and green additive primary-color hues may be compatible with an RGB standard, such as the older International Radio Consultative Committee (CCIR) Standard 601; the International Telecommunications Union, Radiocommunications Sector (ITU-R) "Studio encoding parameters of digital television for standard 4:3 and wide screen 16:9 aspect ratios" Standard BT.601; the Electronic Industries Association (EIA) Standard RS-170A; the Video Electronics Standards Association (VESA) Standard 1.2; or their successor standards and versions.

The source images used in methods of the present invention may be created by many means, such as photography (including direct digital photography), scanning an image recorded in visible light, scanning a hard-copy original image, scanning a hard-copy photograph, and creating art with computer graphics software. The resulting images can be provided in the form of one or more computer-readable files, which may be in a standard image file format, such as a bitmap file format, a standard TIFF file format, or a standard JPEG file format. Proprietary image file formats may also be used with appropriate computer software designed to operate on them. The images may be provided in the form of files carried by machine-readable media such as magnetic computer diskettes, digital magnetic tape, CD-ROM's, etc. Those skilled in the art will recognize that using images stored on such media facilitate the operations of separating colors of the image into a plurality of image levels and forming the color negative versions of those levels when those operations are performed by using a suitably programmed computer. Some printers, especially those designed for photographic printing, may also have built-in capability for performing the operations of separating colors of the image into a plurality of image levels and/or forming the color negative versions of those levels.

Figure 7A:
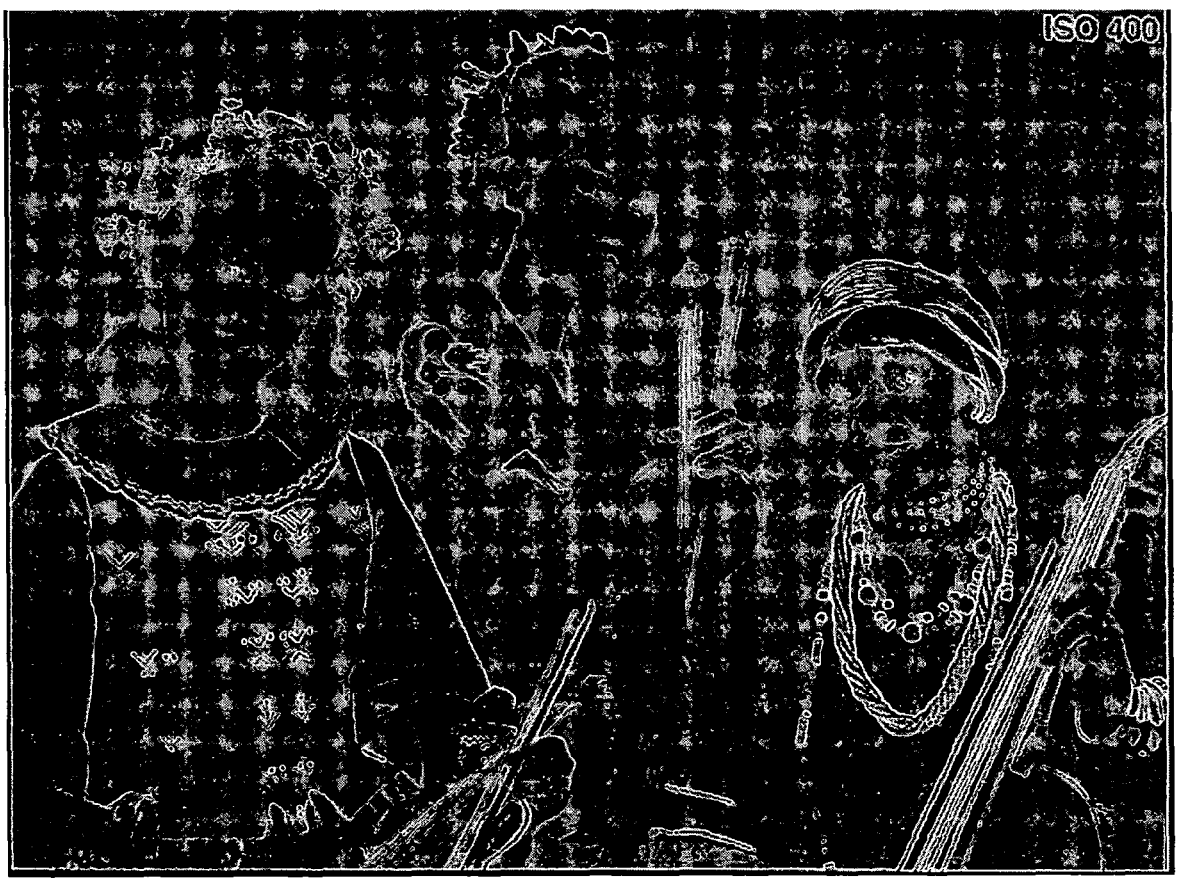
FIGS. 7A-7C show black and white versions of color separation negative images prepared from a type of full-color image that may be used with the invention.
Figure 7B:
Figure 7C:
Figure 8:
FIG. 8 shows a black and white image of a type that may be used with the invention.

FIG. 7A-7C show color separation negative images prepared in accordance with methods of the present invention from a type of full-color image that may be used with the invention. FIG. 8 shows a black and white version of a similar image, as it would be printed by a black-and-white technique described hereinbelow.

The images shown in FIGS. 7A-7C were prepared by separating the original full-color image into three levels or layers: cyan, magenta, and yellow (omitting a black layer) and converting each layer to its negative. Thus, FIG. 7A shows a negative of a cyan color-separation layer. The negative image shown in FIG. 7A is used to print with invisible red-fluorescent ink. Similarly, FIG. 7B shows a negative of a magenta color-separation layer, and the negative image shown in FIG. 7B is used to print with invisible green-fluorescent ink. FIG. 7C shows a negative of a yellow color-separation layer, and the negative image shown in FIG. 7C is used to print with invisible blue-fluorescent ink. The three layers are, of course, printed in mutual registration by the printer.

A related variation of this method may be used to print an image like the one in FIG. 8 with fluorescent ink that is invisible under ordinary illumination within the visible spectrum, and has white fluorescent emission under non-visible illumination. Such inks are described hereinbelow, in the section titled "Ink Compositions." The original black and white image is converted to a negative image and the negative image printed with a white-fluorescent ink on a non-fluorescent background, which may be black. The resultant fluorescent image closely matches FIG. 8.

For many security applications, it is desirable to use images of human subjects for identification purposes and especially desirable to use images containing various natural human skin tones. Therefore, it is desirable that the methods and apparatus for printing invisible full-color fluorescent images have a color gamut including a range of hues corresponding to natural human skin tones. The methods and apparatus of the present invention achieve such a color gamut. If the full-color fluorescent image corresponding to the combination of FIGS. 7A-7C could be reproduced here, the successful reproduction of natural human skin tones would be apparent. Examples of human skin tones achievable by the present invention are the light skin tone corresponding to RGB values of about (190, 147, 127) or (205, 163, 144) and the dark skin tones corresponding to RGB values of about (92, 67, 52) or (129, 96, 82). Similar skin tones are described in terms of the hue/saturation/value (HSV) system as about (18.7, 0.298, 0.804) and (i 7.9, 0.364, 0.506) respectively. A wide variety of other natural human skin tones are included in the color gamuts realized by various embodiments of the present invention.

Passport photographs are a common example of identification images, and the images made in accordance with the present invention may be made in formats that fulfill the official format requirements of a passport photograph. Thus, an invisible color image of a passport holder could be included in a passport. Such an invisible image could be printed adjacent to the normal visible photograph of the passport, or could be provided alone. Observing the invisible full-color-fluorescent image with UV light, for example, would allow ready comparison with the visible photograph and with the person actually presenting the passport. Any discrepancy among the three, such as substitution of a new photograph matching an illegitimate passport carrier, would be readily detected.

Passports are just one of many identity authentication articles that may include an image made in accordance with the present invention. The authentication images, features and methods of the present invention may be used on virtually any article having a surface on which on which an image can be provided.

The passport example illustrates a general method whereby image indicia printed on an article using the present invention may be authenticated. In this method, the article is illuminated with light outside the visible spectrum to display resultant color image indicia by emission of fluorescent light having the several colors of fluorescence described above, and the resultant color image indicia are compared with colored reference indicia or with another reference, such as the human subject in this passport example.

The comparisons with known reference images that are made to authenticate an article on the basis of the printed invisible color fluorescent images may be visual comparisons as in the simple passport example above or may be comparisons made automatically by machine, e.g., by a scanner or by a suitably programmed computer-based system having a color digital camera as an input. Either visual or automatic comparisons can include a step of recording the resultant color image indicia displayed by emission of fluorescent light having the plurality of fluorescence colors. This recording may be one function of the color digital camera. In automatic comparison, the programmed computer is responsive to signals from the color digital camera or other light-sensing detector capable of distinguishing colors. In cases where the fluorescent emission is other than in the visible spectrum, e.g., NIR, IR or UV, then machine detection and comparison will be a necessary step in the process.

Capturing, recording and/or comparison of the colored fluorescent images may be improved by passing the fluorescent light through an optical filter before comparing the fluorescent color image indicia with colored reference indicia. The optical filter may be used to selectively block light according to criteria based on specific light wavelength(s), light wavelengths above a first predetermined wavelength limit, light wavelengths below a second predetermined limit, a bandwidth range of light wavelengths, light having a range of colors, and fluorescent light emitted by one or more known fluorescent chromophores. The latter type of filter is discussed further hereinbelow in connection with masking methods.

Ink Compositions

Ink compositions suitable for use in accordance with the present invention are described first in terms of a general ink composition, and then by specific examples. Throughout this specification and the appended claims, the terms "fluorophore" and "fluorescent chromophore" are used synonymously to mean a molecule that produces a fluorescent emission when irradiated with light at a suitable excitation wavelength (not necessarily in the visible spectrum), a composition exhibiting fluorescence when suitably irradiated, or a compound such as a semiconductor nanocrystal or quantum dot exhibiting fluorescence when suitably irradiated. While the fluorescent emission occurs with respect to image indicia applied to an article when exposed to suitable excitation energy, discussion of such emission herein is not intended to define or limit in any way whether or not the inks of the present invention, when in liquid form in a container, do or do not produce fluorescent emission when exposed to suitable excitation energy.

A general ink composition suitable for the present invention is described below. All percentages are by weight unless otherwise specified. Ranges are provided where the component is dependent on the specific printing system and materials used. Various fluorophores, e.g., IR fluorescent components with different excitation and emission characteristics, such as UV excitation to IR emission, IR excitation to UV emission, UV excitation to IR and visible emission, and/or IR excitation to visible and IR emission, may be combined or used separately depending on the effect desired. Numbers shown in brackets in the compositions listed below are CAS numbers identifying specific component materials. Fluorophores used for the methods of this invention may include substances and chemical compositions as described in U.S. Pat. No. 4,642,526 to Hopkins, and/or U.S. Pat. No. 5,837,042 to Lent et al., the entire disclosures of which are hereby incorporated by reference.

In the most general sense, the ink composition of the present invention contains, by weight % (w/w), distilled or deionized water: 0-95%; a biocide: 0 to 3.0%; a non-ionic surfactant: 0 to 1.0%; organic humectants: 0 to 40%; ethanol: 0 to 40%; propanol: 0 to 40%; buffer salts: 0 to 20.0%; fluorophore pigment or dye: 0 to 20%, including, as the fluorophore pigment or dye or as an additional authentication feature, a microparticle, quantum dot or other component: 0 to 15%. For the red, green and blue emissive inks, the fluorophore pigment or dye used is complementary, respectively, to cyan, magenta and yellow colors of the subtractive inks.

Somewhat more specifically, the general ink composition contains, by weight % (w/w), distilled or deionized water: 0 to 95.0%; a biocide: 0 to 3.0%, such as Proxel GXL (9.3% 1,2-benzisothiazolin-3-one (CAS# [2634-33-5]) (available from Zeneca AG Products, Inc. of Wilmington, Del.); N-methyl-2-pyrrolidinone [872-50-4]: 0 to 20.0%; non-ionic surfactant, e.g., Surfynol 440 [9014-85-1]: 0 to 1.0%; butyl carbitol [112-34-5]: 0 to 30.0%; glycerol [56-81-5]: 0 to 40.0%; diethylene glycol [11-46-6]: 0 to 40.0%; 2-pyrrolidinone: 0 to 20.0%; polyethylene glycols: 0 to 40.0%; ethanol: 0 to 40.0%; propanol: 0 to 40.0%; other anionic, cationic, and non-ionic surfactants: 0 to 15.0%; buffer salts: 0 to 20.0%; fluorophore: 0 to 20.0%, with optional semiconductor nanocrystal, microparticle or other component: 0 to 15.0%. Typical conventional buffer salts include borax, sodium carbonate, and sodium phthalate.

The following examples describe representative ink formulations for use with the BJC-6000 series; BJC-3000 series; S-400 series; S-450 series; and/or the MultiPASS C755 Canon printers. These printer types are listed as examples only; this list is not meant to exclude any specific types of inkjet printers, as this invention and the specific ink formulations disclosed may be modified to work with virtually any type of inkjet printer.

EXAMPLE 1

An invisible red-fluorescent ink was formulated by mixing 1-propanol [71-23-8]: 40.50%; denatured ethanol [64-17-5]: 30.00%; N-methyl-2-pyrrolidinone [872-50-4]: 5.00%; butyl carbitol [112-34-5]: 6.00%; diethylene glycol [11-46-6]: 16.00% and red fluorophore, e.g., Maple Red core shell Evidots (SG-CdSe—ZnS—Na-Tol-05-620-04, available from Evident Technologies, Inc., Troy, N.Y.): 2.50%. Angstrom SC-25, (available from Angstrom Technologies, Inc. of Erlanger, Ky.) is suitable as a substitute for the red fluorophore in this ink.

EXAMPLE 2

An invisible green-fluorescent ink was formulated by mixing deionized water: 70.20%; Proxel GXL [2634-33-5]): 0.10%; N-methyl-2-pyrrolidinone [872-50-4]: 4.00%; Surfynol 440 [9014-85-1]: 0.40%; butyl carbitol [112-34-5]: 6.00%; glycerol [56-81-5]: 8.00%; diethylene glycol [11-46-6]: 8.00%; and green fluorophore, e.g., Catskill Green core shell Evidots (SG-CdSe—ZnS-Tol-540-04, available from Evident Technologies, Inc., Troy, N.Y.): 3.30%. Angstrom SC-4, SC-24, SC-19, (available from Angstrom Technologies, Inc. of Erlanger, Ky.) is also suitable as a substitute for the green fluorophore in this ink.

EXAMPLE 3

An invisible blue-fluorescent ink was formulated by mixing deionized water: 71.00%; Proxel GXL [2634-33-5]: 0.10%; N-methyl-2-pyrrolidinone [872-50-4]: 4.00%; Surfynol 440 [9014-85-1]: 0.40%; butyl carbitol [112-34-5]: 6.00%; glycerol [56-81-5]: 8.00%; diethylene glycol [11-46-6]: 8.00%; and a blue fluorophore, e.g. Lake Placid Blue core shell Evidots (SG-CdSe—ZnS-Tol-05-490-04, available from Evident Technologies, Inc., Troy, N.Y.): 2.50%. Angstrom SC-5 (available from Angstrom Technologies, Inc. of Erlanger, Ky.), and Tinopal SFP, [41098-56-0] (available from Ciba, Inc. of Tarrytown, N.Y.) are also suitable as substitutes for the blue fluorophore in this ink.

EXAMPLE 4

Invisible white-fluorescent inks were formulated by mixing deionized water: 69.70%; Proxel GXL [2634-33-5]): 0.10%; N-methyl-2-pyrrolidinone [872-50-4]: 4.00%; Surfynol 440 [9014-85-1]: 0.40%; butyl carbitol [112-34-5]: 6.00%; glycerol [56-81-5]: 8.00%; diethylene glycol [11-46-6]: 8.00%; and a white fluorophore: 3.80% total consisting of suitably weighted combinations of red, blue, and green (and/or yellow-green or yellow) fluorophores. Organic white fluorophores, such as Angstrom SC-16 (available from Angstrom Technologies, Inc. of Erlanger, Ky.) may also be used to make fluorescent inks for use in the present invention. Suitable yellow fluorophores, such as Angstrom SC-19, SC-19D, SC-6 and SC-27, combined with suitable blue fluorophores, such as SC-5, SC-17, SC-18, SC-29L, SC-11, SC-28 and/or SC-26D, may also be used to make inks with white fluorescent emissions.

Such a white invisible ink may be used to print a black and white image, such as the aforementioned barcodes and/or the image illustrated in FIG. 8. In other embodiments, red, green (or yellow-green or yellow), and blue color fluorescent inks of the present invention may be combined with suitable weighting to print a black and white image.

Other fluorophores suitable for use in the present invention can be of organic or inorganic composition, with a variety of emission colors. Some desirable characteristics of the UV-fluorescent materials used to make invisible inks include: preferably having a high extinction coefficient, a good quantum yield, and fluorescent emission in the desired color range. Suitable particle size (when pigments rather than dyes are used) is also a desirable characteristic. For a fluorescent material to be useful with most of the commercially available inkjet printers the particle size should be less than one micrometer, approximately. Lightfastness and chemical compatibility are desirable in terms of longevity and durability of the printed image. The desired excitation characteristics of the UV-fluorescent fluorophores include a narrow spectral line width specific for either short- and/or long-wave UV light, depending on the desired effect, and a high extinction coefficient.

Among the many different fluorophores useful in this invention are: the benzoxazoles of Angstrom SC-138 (2,5-Bis-benzooxazol-2-yl-benzene-1,4-diol); Anstrom SC-164 (4-Benzooxazol-2-yl-2,5-dihydroxy-benzoic acid methyl ester); and/or Angstrom SC-166 (4-Benzooxazol-2-yl-2,5-dihydroxy-benzoic acid). These fluorophores all emit in the red region (580-650 nm). See the structures for these compounds below, which are referenced using the above Angstrom numbers. These compounds were named according to IUPAC rules, using AutoNom Version 2.1, Beilstein GmbH, and illustrated using ChemDraw Ultra, Version 6.0.1 (© 2000, CambridgeSoft.com, Cambridge, Mass.).

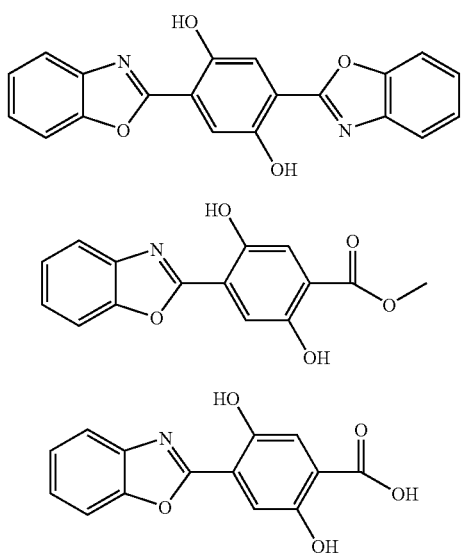

SC-138

SC-164

SC-166

NIR (Near Infrared)/IR-fluorescent materials suitable for use in the present invention include components with various excitation and emission characteristics, such as UV excitation to NIR/IR emission, visible excitation to NIR/IR emission, NIR/IR excitation to UV emission, UV excitation to NIR/IR and visible emission, and/or NIR/IR excitation to visible and NIR/IR emission. Some of these materials are inorganic in nature; however, organic IR-fluorescent materials may be satisfactorily employed. In this regard, the use of quantum dots that fluoresce in the NIR or IR region may be used in one embodiment of the invention, as described in more detail below. Dyes or pigments may be used, with the particle size as a limitation that should be considered. As with most materials useful in inkjet printing, the particle size of the pigment(s) should typically be less than or equal to about one micrometer.

The use of NIR/IR-fluorescent materials for security printing is well-documented and is described in the following patents, which are incorporated herein by reference in their entirety: U.S. Pat. No. 5,614,008 by Escano, et al. and U.S. Pat. No. 5,093,147 by Andrus, et al. Other examples of NIR/IR-fluorescent materials used for security printing include IR-Core PbSe Evidots [1306-24-7] (Available from Evident Technologies, Inc. of Troy, N.Y.), IR-144 [54849-69-3] (Available from Fisher Scientific Inc. of Pittsburgh, Pa.), 3,3'-Diethylthiadicarbocyanine iodide [514-73-8] (Available from Sigma-Aldrich Chemical Co. of St. Louis, Mo.), NIR-667 [163016-50-0] (Available from Sigma-Aldrich Chemical Co. of St. Louis, Mo.), NIR-664 [167638-53-1] (Available from Sigma-Aldrich Chemical Co. of St. Louis, Mo.). The following cyanine-type, NIR/IR fluorophores are commercially available from Licor, Inc. of Lincoln, Nebr.: IRD-41, IRD-700, IRD-800, and CY-5. Pyrilium-type NIR/IR fluorophores, such as those described in the paper by G. A. Reynolds, "Stable Heptamethine Pyrylium Dyes That Absorb in the Infrared", Journal of Organic Chemistry, V. 42, No. 6 (1977), pp. 885-888 are also useful in the present invention. These examples represent a few of the many types of NIR/IR fluorophores that are preferred for use with this invention.

While the use of IR-fluorescent materials provides satisfactory results in many applications, many types of IR-absorbing materials, either pigments and/or dyes, such as Keysorb 990NM, 992NM, 993NM, and others of this series available from Keystone Aniline Corporation of Chicago, Ill., are also useful.

As described above, the inks of the present invention may provide NIR, IR UV and visible light fluorescent emission in response to any of NIR, IR, and UV excitation energy, and may provide NIR, IR and UV fluorescent emission in response to any of NIR, IR UV and visible spectrum excitation energy. Often, but not always, the excitation energy will have a wavelength that is different than that of the emission energy. In some cases, IR-absorbing pigments and dyes may be used in the inks of the present invention, as discussed above.

In some applications, it may be desirable to provide an ink of first color in the red, green, blue set with fluorescent emission in one wavelength range, e.g., visible spectrum, and provide an ink of a second color in this set with fluorescent emission in a different wavelength range, e.g., IR. A third ink in the set could have a fluorescent emission in yet another wavelength range, e.g., NIR. The inks may be caused to fluoresce in response to excitation radiation of a single wavelength or range of wavelengths, or each ink may be chosen so as to fluoresce in response a particular excitation radiation wavelength or range of wavelengths. Thus, the present invention is not limited to color fluorescent emission, as NIR/IR and UV emission are not in the visible spectrum.

Fluorophore microparticles and other microparticles having sizes not resolvable by the unaided human eye may be incorporated into the inks. Such microparticles may have diameters of about one micrometer or less, and are useful as secondary authentication features. They are simple to authenticate but extremely difficult for a counterfeiter to reproduce. The microparticles are typically coded by visible color bands and/or chemical signature tagging. These materials are commercially available from sources such as Microtrace, LLC and Tracking Technologies, Inc., both of Minneapolis, Minn., and are described in U.S. Pat. No. 6,647,649 to Hunt et al., which is incorporated herein by reference. Typically, the microparticles will constitute a fraction of a percent up to 25 weight percent of the ink composition. Some particle sizes that are currently commercially available, about 20 microns, are not useful in inkjet printing methods. However, they are useful when incorporated into laminate films, onto which the inkjet image is printed, and/or when incorporated into films that cover the inkjet image. These materials can also be sprayed onto a printed surface, without affecting the emission characteristics of the other inks of the present invention. While the use of microparticles in pigmented fluorescent coatings is known, as described in U.S. Published Application No. US20020066543A1, the use of such particles in fluorescent inkjet inks of the present invention represents an important advance in the field of such inks and fluorescent image indicia.

Semiconductor nanocrystals, or quantum dots, or quantum rods are very small particles ranging in size from a few atoms to hundreds of atoms in diameter. The unique properties of quantum dots result from quantum-size confinement, which occurs when the semiconductor particles are smaller than their exciton Bohr radii. These materials can be made from a variety of materials using various methods and can be engineered to exhibit particular properties such as dispersion characteristics, reactivity (through the addition of organic functionality), and emission wavelength. Suitable compositions and preparation methods are described in the papers by A. P. Alivisatos et al., "Semiconductor Clusters, Nanocrystals, and Quantum Dots," Science, V. 271 (1996), pp. 933-937; by M. G. Bawendi, et al., "Synthesis and Characterization of Nearly Monodisperse CDE (E=S, Se, Te) Semiconductor Nanocrystallites," Journal of the American Chemical Society, V. 115 (1993), pp. 8706-8715; and A. J. Nozik et al., "Synthesis and Characterization of InP, GaP, and GaInP$_2$ Quantum Dots," Journal of Physical Chemistry, V. 99 (1995), pp. 7754-7759, each of which is incorporated herein by reference in its entirety.

An example of the synthesis of ZnS-capped CdSe quantum dots, adapted from M. A. Hines, et al., "Synthesis and Characterization of Strongly Luminescing ZnS-Capped CdSe Nanocrystals," Journal of Physical Chemistry, V. 100 (1996), pp. 468-471; is presented below in Example 5 for illustration purposes, and is incorporated herein by reference in its entirety.

EXAMPLE 5

The following organometallic synthesis of CdSe/ZnS quantum dots can be used to create quantum dots suitable for inclusion in the inks of the present invention. Stock solutions of Cd and Se can be prepared in an N$_2$-filled drybox by dissolving 0.2 g (2.5 mmol) Se in 4.5 mL of tri-n-octylphosphine (TOP). Me$_2$Cd (0.25 mL, 3.5 mmol) can be added to the TOP-Se and diluted with 19.5 mL of TOP. The Zn and S stock solution can be similarly prepared with 0.52 mL of (TMS)$_2$S (2.5 mmol) in 4.5 mL of TOP, adding 3.5 mL of Me$_2$Zn solution (3.5 mmol) and diluting with 16 mL TOP. These stock solutions are then used in the following synthesis: 12.5 g of tri-n-octylphosphine oxide (TOPO) is heated to 200° C. under vacuum, at which temperature it is dried and degassed for approximately 20 min. The temperature is then raised to 350° C. under approximately 1 atm. of argon. Once the temperature is stabilized, 0.7 mL (0.07 mmol Se, 0.1 mmol Cd) of CD/Se/TOP stock solution is injected into the reaction vessel, and the heat removed. The reaction vessel is allowed to cool to approximately 310° C., at which point an aliquot is taken for analysis. When the temperature reaches 300° C. the ZnS/TOP solution is injected in five 0.55 mL portions at approximately 20 sec. intervals. A total mole ratio of injected reagents is 1:4 Cd/Se:ZnS. Upon cooling, the reaction mixture is stirred at 100° C. for 1 h. The nanocrystals can be purified by precipitation with anhydrous methanol, centrifuging and subsequently washing with the methanol (3×) to remove any residual TOPO.

There are many ways to functionalize the exterior of the nanocrystals to improve the chemical, and photochemical, stability; solubility; reactivity; etc. which make these nanocrystalline fluorophores particularly amendable for use in the current invention. The method described above involves ZnS surface-coated nanocrystals, although in many cases in the present invention it will be desirable to match the surface chemistry of the nanocrystal to that of the ink, the particular application characteristics, and/or other desired properties. Examples of possible surface modifications would include encapsulation into polymer mixtures in the form of microspheres, or other polymer composites, as described in the paper by S. Farmer, et al., "Synthesis of Luminescent Organic/Inorganic Polymer Nanocomposites", Polymeric Materials Science and Engineering, V.82 (2000), pp. 237-238. The addition of a functionalizable, water-soluble siloxane shell, as described in the paper by A. P. Alivisatos et al., "Synthesis and Properties of Biocompatible Water-Soluble Silica-Coated CdSe/ZS Semiconductor Quantum Dots," Journal of Physical Chemistry B, V. 105 (2001), pp. 8861-8871, is another type of surface modification for the nanocrystal fluorophores. Yet another type of surface modification, described in the paper by X. Peng, et al., "Stablization of Inorganic Nanocrystals by Organic Dendrons", Journal of the American Chemical Society, V. 124 (2002), pp. 2293-2298, involves the binding of organic dendron ligands onto the nanocrystal surface.

The methods of surface modification described in the articles referenced above are just a few examples of the numerous methods available for modification of the semiconductor nanocrystal fluorophores. Another approach for altering fluorescent nanocrystals to improve their use for various applications, including inkjet printing methods, is described immediately below. In this approach, CdSe/ZnS core/shell nanocrystals synthesized in TOPO are silica coated to make them water soluble, providing enhanced photochemical stability, and thus better suitable for use in water-based inkjet inks. The following silica-coating procedure is easily scaled and applicable for making silica-coated CdSe/ZnS nanocrystals from approximately 2 to 8 nm in size.

One mL of nanocrystals in butanol/TOPO (optical density ~2) was precipitated with anhydrous methanol. The wet precipitate was dissolved in 50 μL of mercaptopropyltris(methoxy)silane (MPS). After vortexing, 5 μL of tetramethylammonium hydroxide (TMAH) in methanol was added, and the solution became optically clear. This mixture was diluted with 120 mL of anhydrous methanol, basified to a pH of approximately 10 with 750 μL of TMAH, and placed under N$_2$ in a 500 mL three-neck flask. After 1 h of stirring, the solution was gently heated to approximately 60° C. for 30 min. After cooling to room temperature (RT), 90 mL of methanol, 10 mL of 18 MΩ Millipore (Millipore, San Jose, Calif.) water, 600 μL of (trihydroxysilyl)propyl methylphosphonate and 20 μL of MPS were added, stirred for approximately 2 h, heated to ~60° C. for less than 5 min, and cooled to ~30° C. The remaining silanol groups were quenched with a mixture of 20 mL methanol and 2 mL of chlorotrimethylsilane basified with ~3 g of solid TMAH pentahydrate, and then stirred again for ~2 h. The solution was heated to 60° C. for 30 min, and left at RT for 2-4 days while stirring in a N$_2$ atmosphere.

In the next step, the solution was condensed by a factor of 2-5 in a rotary evaporator and left again for 24 hours. At this point the solution was dialyzed in a 10,000 MWCO dialysis tubing against methanol for a day, and subsequently filtered through a 0.45 μm pore size nylon syringe filter. The excess of free silane was removed by condensing the solution using centrifugal filter devices. The volume of the solution was reduced to about 2 mL, and this solution was left for at least 12 h before being passed through a solvent exchange column. NAP columns or a "homemade" 20 cm long column with a 0.7 cm diameter filled with ~5 g of Sephadex G25 medium and equilibrated with 10 mM PB buffer, pH ~7 were used to obtain an eluted solution. The eluted solution was monitored by fluorescence and only the fluorescent fraction was collected. It was left a few hours and then filtered through a 0.22 mm pore size acetate filter. As an optional step, this solution was further dialyzed against 18MΩ Millipore water for 1-4 days in a 10,000 MWCO membrane, run through a 0.22 mm pore size filter, and concentrated to a desired concentration in a vacufuge concentrator at 60° C. (Eppendorf #5301, Westbury, N.Y.).

As a last step, the solution was centrifuged at 20000×g for 30 min and the precipitate was discarded. The supernatant was stored in air with typical OD ~0.3-1 at the absorption feature, corresponding to a concentration of 3-10 μM (extinction coefficient assumed to be $10^5$ $M^{-1}$ $cm^{-1}$).

Quantum dots are also commercially available from sources such as Quantum Dot Corporation of Hayward, Calif., or Evident Technologies, Inc. of Troy, N.Y. These materials are appropriate for inkjet printing because of the small particle sizes and ease of dispersion in water or other solvents, after desired surface modification(s). The use of quantum dots for security markings offer many advantages in that they exhibit high fluorescence intensity, a high quantum yield, a narrow fluorescent emission, and have excellent stability and lightfastness. Typically, the quantum dots will constitute 0.01%-25% (by weight) of the ink composition.

Because quantum dots may be engineered to have selected properties, they may fulfill multiple purposes when included in the fluorescent inks. Quantum dots may be used as the source of the fluorescent color(s), i.e., as the fluorophore, in the ink. Alternatively, or in addition, quantum dots may be used to provide a unique fluorescent signature in the ink. A unique fluorescent signature could be obtained, for example, by using quantum dots having a fluorescent emission that differs in a selected manner, e.g., spectral linewidth, or fluorescent emission, from the fluorophore in the ink having the same or different fluorescent emission wavelength as the quantum dots.

Figure 9:
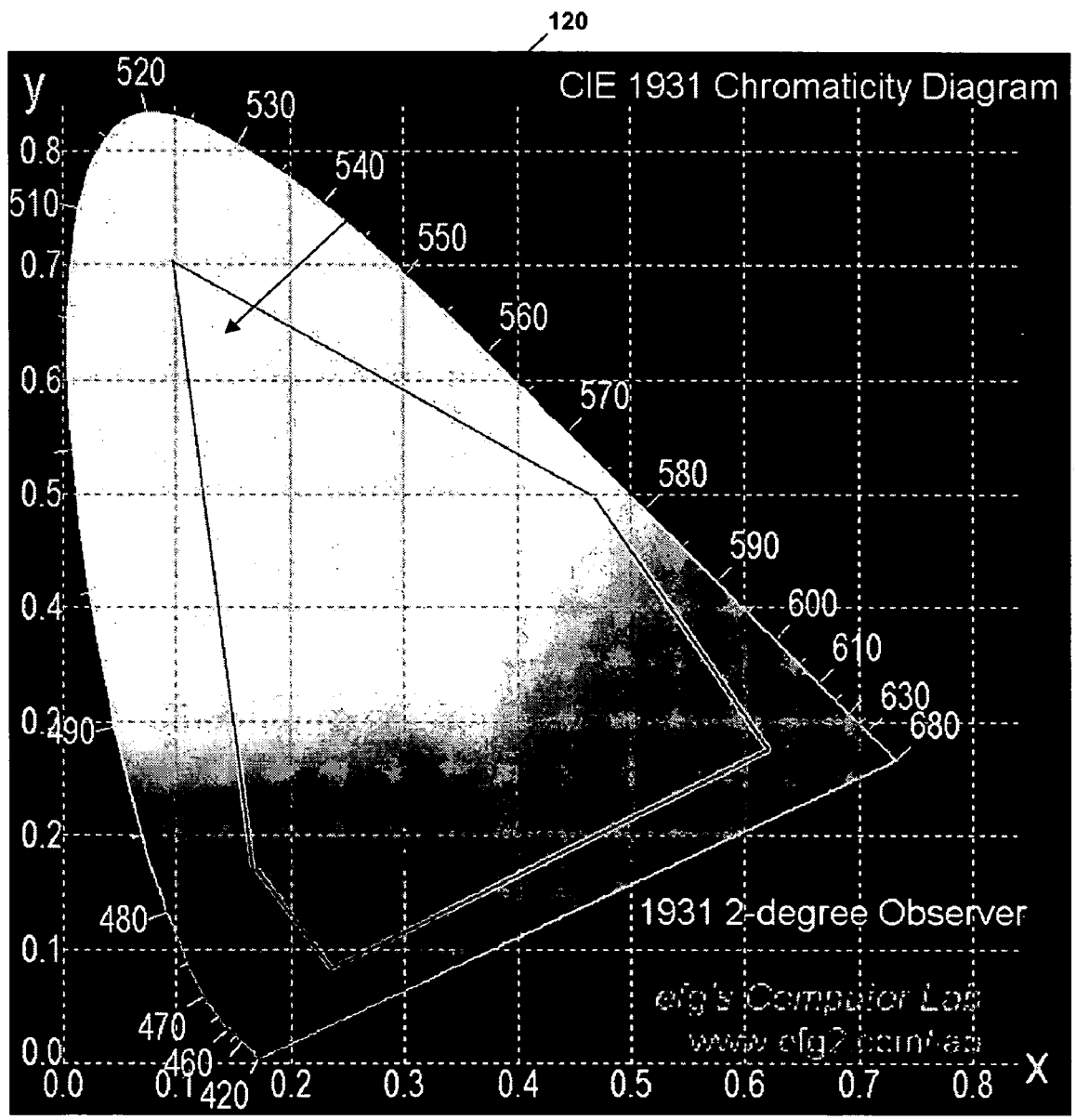
FIG. 9 is a black and white CIE 1931 chromaticity diagram illustrating a color gamut of emissions of fluorescent ink embodiments made in accordance with another quantum dot embodiment of the invention.

Referring now to FIG. 9, a resulting color gamut 120 of emissions of a set of fluorescent inks made in accordance with the present invention is shown. This set of fluorescent inks includes both common fluorophores and/or quantum dots as the fluorescent component. Color gamut 120 is indicated by the CIE 1931 chromaticity coordinates describing a plane comprising the following (X,Y coordinate) points of approximately, (+/−0.05): (0.1, 0.7) (0.16, 0.17) (0.23, 0.008) (0.62, 0.27) (0.46, 0.5).

Other additional authentication features may be included in images and methods of the present invention. In some cases it may be desirable to include scent in one or more of the image layers. Exemplary compositions and materials to produce scent include esters, such as butyl acetate (banana scent), methyl salicylate (wintergreen) and many other unique scents, like benzaldehyde (cherry), and/or phenylethanol (rose). These scents are in general pleasurable, however, unpleasant scents, such as putracene (decaying flesh), mercaptoethanol (rotten eggs), etc. may also be used. Virtually any scent can be added to an ink, in a soluble form, however, encapsulated scent markers may also be used. Chemical taggants (other than quantum dots and microparticles, to the extent considered "chemical taggants") may also be used as authentication features. Suitable chemical taggants include, without limitation, any chemical that can be authenticated; any chemical that contains a unique element, or structural element, found few other places, such as deuterium, tritium, gadolinium (Gd), and/or terbium (Tb); structural elements such as crown ethers, rotaxanes, and linear alkanes of a sort that can be authenticated through the presence of specific patterns detectable by mass spectrometry. In some cases, it may be desirable to use immunochemical taggants such as specific complimentary antigens and antibodies.

Materials having electromagnetic radiation emission in wavelength ranges other than NIR, IR, visible spectrum and UV, e.g., X-ray and shortwave RF, may also be employed as secondary authentication features. In some cases these alternative materials may provide a continuous emission and in other cases will emit only in response to appropriate excitation energy. Other authentication features include the use of masking elements, described immediately below, and the use of microparticles in the ink compositions. The latter methods are described above in the section titled "Ink Compositions."

In the masking methods, at least one of the multiple chromophores included in the fluorescent inks is not intended to contribute to visual appearance of the image but instead selectively masks fluorescent light from one or more of the other chromophores. With suitable selection of such a masking chromophore and a corresponding optical filter, the masking fluorescence can be filtered out to allow authentication using the resulting unmasked color combinations from the other fluorescent chromophores.

Thus, in this embodiment, the ink formulations may include a fluorescent compound in an amount that, when printed, will serve to mask one or more, or all of the other fluorescent colors. This masking component may fluoresce with a bright blue color, for example. This may also be done with a second printing pass using a masking-type cartridge in a single color slot and printing a solid single-color layer over the previous image. This may be accomplished by inclusion of the masking chromophore into a specific ink, or inclusion into an entire set of inks, the use of an overlaid film, and/or by overprinting of the original invisible fluorescent image using an offset printing method with an overprint varnish of a single fluorescent color, or many other possible methods of application. For example, in this method, a secondary image may be created that will fluoresce in a bright blue color with a peak emission at about 420 nm, which hides the original multicolor image. The original image is then detectable through the use of a wavelength-selective filter or combination of filters.

As mentioned above, the present invention includes the use of multiple authentication features in connection with an image. The multiple authentication features may, for the purposes of explanation, and not limitation of the invention, be categorized as primary, secondary and tertiary features. Primary authentication features are the images provided by the image layers making up the authentication image, as discussed above.

Secondary authentication features provide information, in many forms, that is included in one or more of the image levels. Secondary authentication features included in one image level may be, but are not necessarily, excluded from the other image levels. The present invention encompasses as a secondary authentication feature virtually any compound or material that provides information that can be detected, whether by unaided human faculties or with the use of detection equipment. Without limiting the invention, examples of secondary authentication features discussed above include scent, microparticles, quantum dots and other chromophores (fluorophores) having distinguishable emission attributes such as wavelengths, line widths, intensities, and decay times of fluorescent light emission.

Tertiary authentication features include patterns or relationships between primary features, between primary features and secondary features and/or between secondary features. For example, one tertiary authentication feature could be the combination of an apple as the primary image and red emission at 620 nm and a banana scent. As another example, one image layer could be designed to have a fluorescent IR emission with attributes that, in combination with attributes from a visible spectrum emission from a second image layer, create a combination of attributes constituting a tertiary authentication feature. Thus, a tertiary authentication feature is not a component of the fluorescent inks of the present invention, but rather is a pattern or relationship between discernable attributes of the primary and secondary authentication features. As those skilled in the art will appreciate, there are a large number of tertiary authentication features that can be developed and used. Tertiary authentication features can be developed so as to be detectible with unaided human faculties, with only machines, including computer hardware and software, or with a combination of the two.

To use tertiary authentication features in connection with authentication of an article, the tertiary authentication feature is first defined, the primary and secondary authentication features are created so as to include the tertiary authentication feature. Then, at the time of authentication, a check is made for the pattern or relationship of the tertiary authentication feature. The presence of the tertiary authentication feature suggests authenticity and its absence indicates forgery.

Thus, an overall method in accordance with the invention for marking an article with image indicia, includes providing a plurality of inkjet inks having a plurality of fluorescence colors under illumination outside the visible spectrum and substantially invisible under illumination within the visible spectrum, converting the color indicia to be printed to a color negative form, separating the colors of the image indicia into a plurality of image levels in accordance with the fluorescence colors of the inks, using an inkjet printer intended for use with subtractive-color ink containers (replacing each subtractive-color ink container with a container containing the complementary color among the fluorescent inks) and printing each image level in mutual registration on the article using the corresponding ink. The printed indicia may be used for authentication, information, or decoration, for example.

The methods of the invention may be facilitated by providing a set of inkjet containers including (1) a first ink container carrying ink invisible under ordinary white-light illumination, but fluorescent with a color complementary to cyan, (2) a second ink container carrying ink invisible under ordinary white-light illumination, but fluorescent with a color complementary to magenta, and (3) a third ink container carrying ink invisible under ordinary white-light illumination, but fluorescent with a color complementary to yellow.

A fourth ink container carrying black ink may also be provided in the set or provided separately. The three containers of the set carrying red, green, and blue fluorescent inks may be labeled accordingly, as "Replaces cyan ink cartridge" for the cartridge carrying red-fluorescent ink, "Replaces magenta ink cartridge" for the cartridge carrying green-fluorescent ink, and "Replaces yellow ink cartridge" for the cartridge carrying blue-fluorescent ink.

The invention is useful for marking articles with image indicia for authentication, information, or decoration, wherever a number of invisible fluorescent inks are needed. Inkjet printing can be used with the inks to create color images, both visible and invisible, that are useful in security printing. The present invention illustrates methods of printing that adapt emissive, or additive, colors derived from the use of fluorescent materials to create images, including full color images, with technology such as printers and software that is commonly used to create reflective color images. A number of security methods, useful separately and/or in combinations use multiple authentication features that allow for visual and machine authentication of security marks. These methods can be used with virtually any commercially available or industrial inkjet printer, including those that use thermal, piezo, drop-on-demand, and continuous piezo types of inkjet printing.

Although the foregoing has been a description and illustration of specific embodiments of the invention, various modifications, additions, and changes can be made thereto by persons skilled in the art without departing from the scope and spirit of the invention as defined by the following claims. For example, a single emission color of a particular security mark may serve mainly as a location device to point the user to the exact location of additional, and/or machine-read, security marks. In another example, an invisible, full-color image, able to be seen only under UV irradiation, is used as a primary security mark, while additional marks, such as IR-fluorescent compounds, and/or additional UV-fluorescent compounds, and/or microparticle taggants, and/or other chemical taggants, etc., are included within the invisible, full-color image to serve as secondary, tertiary, and additional security features.

Although the invention has been described and illustrated with respect to [an] exemplary embodiment[s] thereof, it should be understood by those skilled in the art that the foregoing and various other changes, omissions and additions may be made therein and thereto, without parting from the spirit and scope of the present invention.

What is claimed is:

1. A method of marking an article with image indicia for authentication, information, or decoration, the method comprising the steps of:

providing a plurality of inks that, when printed as image indicia on an article, fluoresce with a color when exposed to excitation energy and are substantially invisible under illumination within the visible spectrum;

separating colors of the image indicia into a plurality of image levels; and printing each image level of said plurality of image levels in mutual registration on the article using said plurality of inks, wherein said printing is performed using an inkjet printer intended for use with subtractive-color ink, the plurality of inks including red, green and blue additive-color fluorescent inks, wherein said printing is performed using an inkjet printer, the method further comprising the steps of:

converting indicia to be printed to a color negative form; and providing a set of red, green and blue additive-color inks within said plurality of inks that are complementary, respectively, to cyan, magenta and yellow subtractive-color inks.

2. The method of claim 1, wherein said plurality of inks comprises inkjet inks and said printing is performed using an inkjet print head.

3. The method of claim 1, wherein said printing is performed using an inkjet printer intended for use with subtractive-color ink cartridges, the method further including the step of using cartridges in the inkjet printer having red, green and blue additive-color inks that are complementary, respectively, to cyan, magenta and yellow subtractive-color inks.

4. The method of claim 1, wherein said printing is performed using an inkjet printer intended for use with reservoirs containing subtractive-color ink, the method further including the step of using red, green and blue additive-color inks in the reservoirs that are complementary, respectively, to cyan, magenta and yellow subtractive-color inks.

5. The method of claim 1, further comprising the step of:disabling any black-ink print head of an inkjet printer used in said printing.

6. The method of claim 1, further including the step of selecting a suitably weighted combination of colors selected from said set of red, green and blue additive colors to create white additive color.

7. The method of claim 1, wherein said set of additive color inks includes red, blue, and green additive primary colors compatible in accordance with an RGB standard.

8. The method of claim 7, wherein said RGB standard is selected from the list consisting of:
International Radio Consultative Committee (CCIR) Standard 601;
International Telecommunications Union, Radiocommunications Sector (ITU-R) "Studio encoding parameters of digital television for standard 4:3 and wide screen 16:9 aspect ratios" Standard BT.601;
Electronic Industries Association (EIA) Standard RS-170A;
Video Electronics Standards Association (VESA) Standard 1.2; and
their successor standards and versions.

9. The method of claim 1, wherein said set of additive-color inks comprises at least two components from the group consisting of:
a red component having a dominant emissive wavelength between about 590 and about 680 nanometers;
a green component having a dominant emissive wavelength between about 500 and about 550 nanometers; and
a blue component having a dominant emissive wavelength between about 420 and about 480 nanometers.

10. The method of claim 1, wherein the set of additive color inks comprises at least two components from the group consisting of:
a red component having CIE 1931 chromaticity coordinates of about (+/−0.05): (0.48, 22) (0.48, 0.43), and (0.67, 0.26);
a green component having CIE 1931 chromaticity coordinates of about (+/−0.05): (0.14, 42) (0.12, 0.72), and (0.43, 0.46); and
a blue component having CIE 1931 chromaticity coordinates of about (+/−0.05): (0.16, 10) (0.15, 0.38), and (0.30, 0.15).

11. The method of claim 1, wherein said separating colors of the image indicia into a plurality of image levels is performed by a suitably programmed computer.

12. The method of claim 1, wherein said separating colors of the image indicia into a plurality of image levels is performed by a printer used to perform the said printing.

13. The method of claim 1, wherein the image indicia include human skin tones.

14. The method of claim 1, wherein the color gamut of the image indicia includes hues having RGB values of about (190, 147, 127), (205, 163, 144), (92, 67, 52), and (129, 96, 82), and by hue/saturation/value (HSV) indices of about (18.7, 0.298, 0.804) and (17.9, 0.364, 0.506).

15. The method of claim 1, wherein the image indicia comprise at least one image of a human subject.

16. The method of claim 1, wherein the image indicia fulfill the official format requirements of a passport photograph.

17. The method of claim 1, wherein one or more of the plurality of inks includes a plurality of fluorescence colors includes microparticles of a size not resolvable by the unaided human eye.

18. The method of claim 17, wherein said microparticles are coded by a specific pattern of color bands.

19. The method of claim 17, wherein said microparticles are coded by chemical signature tagging.

20. The method of claim 17, wherein said microparticles have diameters of about one micrometer or less.

21. The method of claim 1, wherein the image indicia printed on the article is for authentication, the method further including the steps of:
illuminating the article with excitation energy to display resultant color image indicia by emission of fluorescent light having a plurality of fluorescence colors; and
comparing the resultant color image indicia with colored reference indicia.

22. The method of claim 21, further comprising the step of:
passing the emitted fluorescent light through an optical filter before comparing the resultant color image indicia with colored reference indicia.

23. The method of claim 22, wherein the optical filter selectively blocks light according to criteria selected from the list consisting of: specific light wavelength(s), light wavelengths above a first predetermined limit, light wavelengths below a second predetermined limit, a bandwidth range of light wavelengths, light having a range of colors, and fluorescent light emitted by one or more known fluorescent chromophores.

24. The method of claim 21, wherein the step of comparing the resultant color image indicia with colored reference indicia is performed visually.

25. The method of claim 21, wherein the step of comparing the resultant color image indicia with colored reference indicia is performed by a suitably programmed computer.

26. The method of claim 1, wherein the image indicia marked on the articles include multiple authentication features.

27. The method of claim 26, wherein said multiple authentication features comprise multiple chromophores having distinguishable wavelengths, linewidths, intensities, and decay times of fluorescent light emission.

28. The method of claim 27, wherein at least one chromophore of said multiple chromophores does not contribute to visual appearance of the image but selectively masks the fluorescent light from other chromophores.

29. The method of claim 1, wherein the image indicia marked on the articles include primary, secondary and tertiary authentication features.

30. The method of claim 29, further including the steps of:
defining as tertiary authentication features a relationship between (i) at least two of said primary authentication features, (ii) at least two of said secondary authentication features or (iii) at least one of said primary authentication features and at least one of said secondary authentication features; and
exposing the article to said excitation energy and comparing said color with said tertiary authentication feature.

31. A method of marking an article with image indicia for authentication, information, or decoration, the method comprising the steps of:
providing a plurality of inkjet inks that, when printed as indicia on an article, fluoresce with a color when exposed to excitation energy and are substantially invisible under illumination within the visible spectrum;
converting color indicia to be printed to a color negative form;
separating colors of the image indicia into a plurality of image levels;
providing an inkjet printer intended for use with subtractive-color ink; and
printing each image level of said plurality of image levels in mutual registration on the article using said plurality of inkjet inks and said inkjet printer, the plurality of inks including red, green, and blue additive-color fluorescent inks.

32. The method of claim 21, wherein each of the plurality of inkjet inks comprises a fluorescent chromophore and at least one chemical taggant including a chemical taggant selected from the group consisting of a semiconductor nanocrystal, a microparticle, other chemical taggant, and any combinations thereof.

33. The method of claim 31, wherein each of the plurality of inkjet inks fluoresces under excitation by ultraviolet (UV) light.

34. The method of claim 31, wherein each of the plurality of inkjet inks fluoresces under excitation by infrared (IR) light.

35. The method of claim 31, wherein the plurality of inkjet inks fluoresce in additive colors that are complementary to the colors of conventional cyan, magenta, and yellow subtractive-color inks.

36. The method of claim 31, wherein the plurality of inkjet inks fluoresce in red, green, and blue portions of the visible spectrum.

37. The method of claim 36, wherein the plurality of inkjet inks comprises:
  a red fluorescence color component having a dominant emissive wavelength between about 590 and about 680 nanometers;
  a green fluorescence color component having a dominant emissive wavelength between about 500 and about 550 nanometers; and
  a blue fluorescence color component having a dominant emissive wavelength between about 420 and about 480 nanometers.

38. The method of claim 31, wherein the plurality of inkjet inks comprises:
  a red fluorescence color component having CIE 1931 chromaticity coordinates of about (+/−0.05): (0.48, 0.22) (0.48, 0.43), and (0.67, 0.26);
  a green fluorescence color component having CIE 1931 chromaticity coordinates of about (+/−0.05): (0.14, 0.42) (0.12, 0.72), and (0.43, 0.46); and
  a blue fluorescence color component having CIE 1931 chromaticity coordinates of about (+/−0.05): (0.16, 0.10) (0.15, 0.38), and (0.30, 0.15).

39. A method of authenticating articles, comprising the steps of:
  marking authentic articles with invisible full-color image indicia by the method of claim 31;
  using suitable illumination, illuminating articles to be authenticated; and
  comparing any resultant fluorescent emissive indicia with the predetermined full-color image indicia marked on authentic articles.

40. A method of authenticating articles, comprising the steps of:
  marking authentic articles with invisible predetermined full-color image indicia by performing the substeps of:
    providing a plurality of inkjet inks that, when printed as indicia on the article, fluoresce with a color when exposed to excitation energy and are substantially invisible under illumination within the visible spectrum;
    converting color indicia to be printed to a color negative form;
    separating colors of the image indicia into a plurality of image levels; and
    providing an inkjet printer intended for use with subtractive-color ink; and
    printing each image level of said plurality of image levels in mutual registration on the article using said plurality of inkjet inks and said inkjet printer, the plurality of inks including red, green, and blue additive-color fluorescent inks;
  using suitable excitation energy, exposing articles to be authenticated to said excitation energy; and
  comparing any resultant fluorescent emissive indicia with the predetermined full-color image indicia marked on authentic articles.

41. A method according to claim 31, wherein each of the plurality of inject inks further comprises:
  (a) distilled and/or deionized water;
  (b) a biocide;
  (c) N-methyl-2-pyrrolidinone;
  (d) a non-ionic surfactant;
  (e) butyl carbitol;
  (f) glycerol;
  (g) diethylene glycol;
  (h) 2-pyrrolidinone;
  (i) polyethylene glycol;
  (j) ethanol; and
  (k) propanol.

42. A method according to claim 32, wherein said fluorescent chromophore is present in an amount up to 20 wt. % and said at least one chemical taggant is present in an amount up to 20 wt. %.

43. The method of claim 31, wherein said plurality of inks comprises inkjet inks and said printing is performed using an inkjet print head.

44. The method of claim 31, wherein said separating colors of the image indicia into a plurality of image levels is performed by a suitably programmed computer.

45. The method of claim 31, wherein said separating colors of the image indicia into a plurality of image levels is performed by a printer used to perform said printing.

46. The method of claim 31, wherein the image indicia include human skin tones.

47. The method of claim 31, wherein the color gamut of the image indicia includes hues having RGB values of about (190, 147, 127), (205, 163, 144), (92, 67, 52), and (129, 96, 82), and by hue/saturation/value (HSV) indices of about (18.7, 0.298, 0.804) and (17.9, 0.364, 0.506).

48. The method of claim 31, wherein the image indicia comprise at least one image of a human subject.

49. The method of claim 31, wherein the image indicia fulfill the official format requirements of a passport photograph.

50. The method of claim 31, wherein one or more of the plurality of inkjet inks includes microparticles of a size not resolvable by the unaided human eye.

51. The method of claim 50, wherein said microparticles are coded by a specific pattern of color bands.

52. The method of claim 50, wherein said microparticles are coded by chemical signature tagging.

53. The method of claim 50, wherein said microparticles have diameters of about one micrometer or less.

54. The method of claim 31, wherein the image indicia printed on the article is for authentication, the method further including the steps of:
  illuminating the article with excitation energy to display resultant color image indicia by emission of fluorescent light having a plurality of fluorescence colors; and
  comparing the resultant color image indicia with colored reference indicia.

55. The method of claim 54, further comprising the step of: passing the emitted fluorescent light through an optical filter before comparing the resultant color image indicia with colored reference indicia.

56. The method of claim 55, wherein the optical filter selectively blocks light according to criteria selected from the list consisting of: specific light wavelength(s), light wavelengths above a first predetermined limit, light wavelengths below a second predetermined limit, a bandwidth range of light wavelengths, light having a range of colors, and fluorescent light emitted by one or more known fluorescent chromophores.

57. The method of claim 54, wherein the step of comparing the resultant color image indicia with colored reference indicia is performed visually.

58. The method of claim 54, wherein the step of comparing the resultant color image indicia with colored reference indicia is performed by a suitably programmed computer.

59. The method of claim 31, wherein the image indicia marked on the articles include multiple authentication features.

60. The method of claim 59, wherein said multiple authentication features comprise multiple chromophores having distinguishable wavelengths, linewidths, intensities, and decay times of fluorescent light emission.

61. The method of claim 60, wherein at least one chromophore of said multiple chromophores does not contribute to visual appearance of the image but selectively masks the fluorescent light from other chromophores.

62. The method of claim 31, wherein the image indicia marked on the articles include primary, secondary and tertiary authentication features.

63. The method of claim 62, further including the steps of:
defining as tertiary authentication features a relationship between (i) at least two of said primary authentication features, (ii) at least two of said secondary authentication features or (iii) at least one of said primary authentication features and at least one of said secondary authentication features; and
exposing the article to said excitation energy and comparing said color with said tertiary authentication feature.

64. The method of claim 31, further comprising:
(a) providing black ink; and
(b) separating colors of the image indicia into a plurality of color image levels and a black image level;
(c) wherein said printing step includes printing the plurality of color image levels and the black image level in mutual registration on the article using the plurality of inkjet inks, the black ink, and the inkjet printer.

* * * * *

UNITED STATES PATENT AND TRADEMARK OFFICE
CERTIFICATE OF CORRECTION

PATENT NO. : 7,821,675 B2  
APPLICATION NO. : 10/818058  
DATED : October 26, 2010  
INVENTOR(S) : Coyle et al.

It is certified that error appears in the above-identified patent and that said Letters Patent is hereby corrected as shown below:

In column 21, claim 10, line 35, before "22" insert "0.";

In column 21, claim 10, line 38, before "42" insert "0.";

In column 21, claim 10, line 41, before "10" insert "0."; and

In column 23, claim 32, line 4, delete "21" and insert "31" therefor.

Signed and Sealed this
Twenty-eighth Day of June, 2011

David J. Kappos
*Director of the United States Patent and Trademark Office*